(12) United States Patent
Fujii et al.

(10) Patent No.: US 9,188,177 B2
(45) Date of Patent: Nov. 17, 2015

(54) BRAKE DISC

(75) Inventors: Toru Fujii, Kyotanabe (JP); Kazuya Okubo, Kyotanabe (JP); Kiyotaka Obunai, Kyotanabe (JP); Yoshihisa Kubota, Kyotanabe (JP); Hideaki Okada, Kyotanabe (JP); Tsuyoshi Nakatsuji, Takatsuki (JP)

(73) Assignees: SUNSTAR ENGINEERING INC., Takatsuki-shi (JP); THE DOSHISHA, Kyoto-shi (JP)

( * ) Notice: Subject to any disclaimer, the term of this patent is extended or adjusted under 35 U.S.C. 154(b) by 0 days.

(21) Appl. No.: 13/985,163

(22) PCT Filed: Feb. 16, 2012

(86) PCT No.: PCT/JP2012/053704
§ 371 (c)(1),
(2), (4) Date: Oct. 14, 2013

(87) PCT Pub. No.: WO2012/111771
PCT Pub. Date: Aug. 23, 2012

(65) Prior Publication Data
US 2014/0326550 A1 Nov. 6, 2014

(30) Foreign Application Priority Data
Feb. 18, 2011 (JP) ................................ 2011-033779

(51) Int. Cl.
*F16D 65/00* (2006.01)
*F16D 65/12* (2006.01)
*F16D 65/02* (2006.01)

(52) U.S. Cl.
CPC ............ *F16D 65/0006* (2013.01); *F16D 65/12* (2013.01); *F16D 65/128* (2013.01); *F16D 2065/132* (2013.01); *F16D 2065/1328* (2013.01)

(58) Field of Classification Search
USPC .............. 188/218 A, 218 R, 218 XL, 264 A, 188/264 AA
See application file for complete search history.

(56) References Cited

U.S. PATENT DOCUMENTS 3,724,613 A * 4/1973 Bermingham .......... 188/218 XL
4,049,090 A * 9/1977 Buell ....................... 188/251 M
(Continued)

FOREIGN PATENT DOCUMENTS

DE 2022301 A1 5/1971
JP 47-24066 B1 7/1972
(Continued)

OTHER PUBLICATIONS

International Search Report dated May 1, 2012, issued in corresponding application No. PCT/JP2012/053704.

*Primary Examiner* — Christopher Schwartz

(57) ABSTRACT

A brake disc is provided capable of effectively reducing the generation of noise such as brake noise by making specifications relating to lightening holes different from each other between two brake disc plates. In the brake disc, two brake disc plates are laminated so as to slide on each other by vibration during braking, and specifications relating to one or more selected from lightening holes, plate thickness, diameter, and warpage are made different from each other between the brake disc plates. In addition, lightening holes are formed on at least one of the brake disc plates, and one or more specifications selected from the number of lightening holes, the shapes of the lightening holes, the sizes of the lightening holes, and the arrangement positions of the lightening holes are made different from each other between the brake disc plates.

9 Claims, 26 Drawing Sheets

(56) References Cited

U.S. PATENT DOCUMENTS

| | | | | |
|---|---|---|---|---|
| 5,878,843 | A * | 3/1999 | Saum | 188/218 XL |
| 6,241,055 | B1 * | 6/2001 | Daudi | 188/73.35 |
| 7,059,456 | B2 * | 6/2006 | Winklemann et al. | 188/264 AA |
| 7,100,748 | B2 * | 9/2006 | Prahst | 188/218 XL |
| 8,028,739 | B2 * | 10/2011 | Walker et al. | 164/98 |
| 8,408,369 | B2 * | 4/2013 | Woychowski et al. | 188/218 XL |
| 2008/0135359 | A1 * | 6/2008 | Basirico et al. | 188/218 XL |

FOREIGN PATENT DOCUMENTS

| | | |
|---|---|---|
| JP | 50-35179 B1 | 11/1975 |
| JP | 54-61186 U | 4/1979 |
| JP | 58-39826 A | 3/1983 |
| JP | 63-77142 U | 5/1988 |
| JP | 08-200410 A | 8/1996 |
| JP | 2002-303343 A | 10/2002 |
| JP | 2003-74604 A | 3/2003 |
| JP | 2004-11841 A | 1/2004 |

* cited by examiner

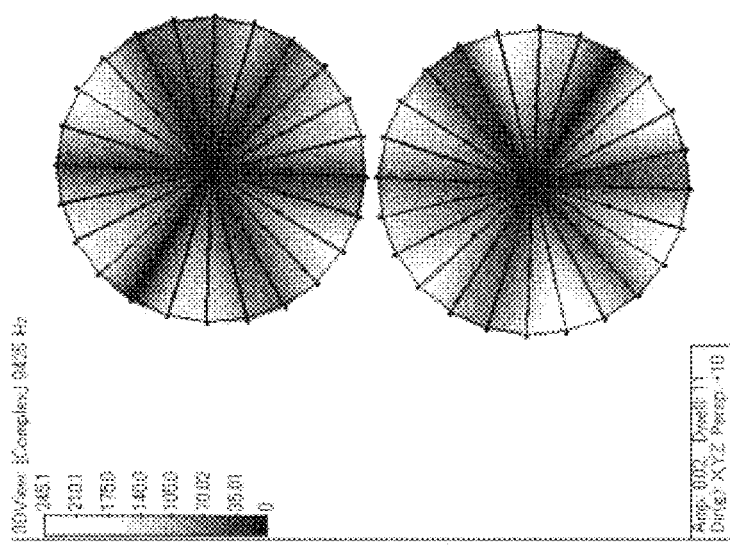
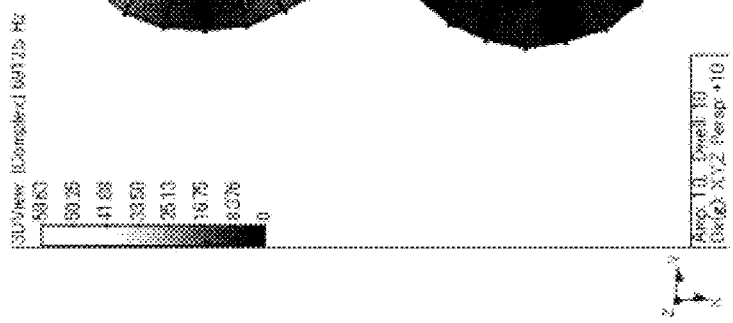
Fig. 26 (a): Disc D3.00 (b): Disc D3.75

Fig. 28
(a)
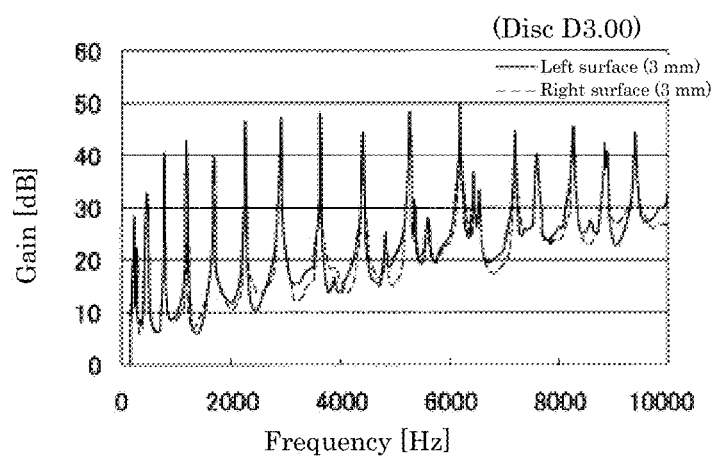
(b)
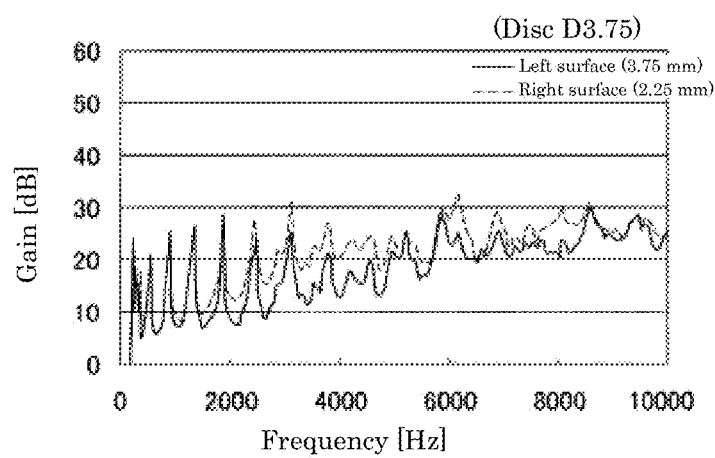

BRAKE DISC

TECHNICAL FIELD

The present invention relates to a brake disc that can be preferably used as a brake disc for a motor vehicle or a two-wheeled motor vehicle.

BACKGROUND ART

Generally, as a brake disc for a two-wheeled motor vehicle, there have been widely put to practical use a brake disc that is provided with an mounting portion to be mounted to a wheel and a sliding portion that makes sliding contact with a brake pad, and is formed by press-molding a single piece of metal plate, and a floating brake disc that is provided with an annular sliding disc having a sliding portion against which a brake pad is pressed, a hub disc which is attached to the inside of the sliding disc, and a plurality of connectors which connect the sliding disc and the hub disc to each other in a floating state.

Further, there has also been widely adopted a brake disc that includes a plurality of lightening holes formed on a sliding portion in a predetermined arrangement for the purpose of total weight reduction, improvement of the heat releasing property in the sliding portion, cleaning of a brake pad, and the like (see Patent Document 1, for example).

Furthermore, in order to prevent the generation of noise during braking, there have been developed a brake disc that includes two brake disc plates which are integrally laminated (see Patent Document 2, for example), and a brake disc that includes two brake disc plates one of which has an annular concave groove on the surface facing the other brake disc plate, wherein the brake disc plates are integrally laminated in such a manner that an damping member is arranged on the concave groove (see Patent Document 3, for example).

CITATION LIST

Patent Literatures

Patent Document 1: JP-A No. 2003-74604
Patent Document 2: JP-A No. H08-200410
Patent Document 3: JP-A No. 2004-11841

SUMMARY OF INVENTION

Technical Problem

In Patent Documents 2 and 3, there is described a brake disc that is formed by laminating two brake disc plates. However, no lightening hole is formed on sliding portions of the two brake disc plates. Further, the two brake disc plates have the same thickness and the same diameter. In addition, each of the brake disc plates is formed into a flat plate without warpage. Therefore, a brake disc in which specifications relating to lightening holes such as presence or absence, the number, positions, and phases of lightening holes are made different from each other between the brake disc plates, or a brake disc in which specifications relating to the thickness, diameter, or warpage of the brake disc plate are made different from each other between the brake disc plates has not been developed.

It is an object of the present invention to provide a brake disc capable of effectively reduce the generation of noise such as brake noise by making specifications of at least one pair of brake disc plates to be laminated different from each other.

Solution to Problem

The applicants of the present application have focused on the fact that, when a plurality of brake disc plates are used by laminating them, adjacent brake disc plates slide on each other by vibration in the thickness direction, the circumferential direction, and the radial direction during braking, thereby making it possible to reduce the generation of noise such as brake noise. Accordingly, the applicants have got the idea that it is possible to appropriately adjust the slide between adjacent brake disc plates and thereby effectively prevent brake noise without a complicated configuration of a brake disc by making specifications relating to one or more selected from lightening holes, plate thickness, diameter, and warpage different from each other between the brake disc plates, and have thereby completed the present invention.

The brake disc according to the present invention comprises a plurality of brake disc plates, the plurality of brake disc plates being laminated so as to slide on each other by vibration during braking, wherein specifications relating to one or more selected from lightening holes, plate thickness, diameter, and warpage are made different from each other between at least one pair of brake disc plates in the plurality of brake disc plates. Making specification of warpage different from each other indicates using a brake disc plate with warpage and a brake disc plate without warpage, using brake disc plates with warpages of different sizes, using brake disc plates with warpages in opposite directions, or using brake disc plates with warpages in different areas in the radial direction.

In this brake disc, when the sliding portion of the brake disc is sandwiched by the brake pad and braking force is applied thereto, adjacent brake disc plates slide on each other by vibration in the thickness direction, the circumferential direction, and the radial direction at this point, and the generation of noise such as brake noise is thereby reduced. In addition, since specifications relating to one or more selected from lightening holes, plate thickness, diameter, and warpage are different from each other between at least one pair of brake disc plates, it is possible to adjust the slide between the adjacent brake disc plates during braking and thereby effectively prevent the generation of noise such as brake noise without a complicated configuration of the brake disc. The lightening holes are preferably formed on the sliding portion with which the brake pad makes sliding contact. However, the lightening holes can also be formed on any portion other than the sliding portion. Further, it is also possible that specification such as the shapes or materials of the brake disc plates be made different from each other in addition to the specifications relating to lightening holes, plate thickness, diameter, or warpage. Further, these brake disc plates are partially joined so as to slide on each other by vibration during braking. For example, the brake disc plates are placed to overlap with each other, and can be joined with mounting bolts for mounting the brake disc to the wheel, with rivets or bolts, by welding, or by holding the outer peripheral part or the like of one of the brake disc plates in a folded back portion of another one of brake disc plates.

Further, one or more selected from the number of lightening holes, the shapes of lightning holes, the sizes of lightening holes, and the arrangement positions of lightening holes may be made different from each other as the specifications. In this regard, making the number of the lightening holes different from each other includes two patterns of brake discs including a brake disc in which the lightening holes are formed on at least one pair of brake disc plates and the number of the lightening holes are made different from each other between the pair of brake disc plates, and a brake disc that includes a brake disc plate having lightening holes and a brake disc plate having no lightening hole.

It is also a preferred embodiment that the at least one pair of brake disc plates have the same configuration in which lightening holes are formed, and the plurality of brake disc plates are laminated in such a manner that the arrangement positions of the lightening holes are displaced in the circumferential direction between the at least one pair of brake disc plates. In this case, it is possible to configure the brake disc using the brake disc plates having the same configuration in which lightening holes are formed. Therefore, it is not necessary to provide a plurality of equipment for manufacturing brake disc plates, and such a configuration is therefore advantageous in cost of equipment investment.

When the at least one pair of brake disc plates have the same configuration in which lightening holes are formed, it is also a preferred embodiment that the plurality of brake disc plates are laminated in such a manner that the arrangement positions of the lightening holes are displaced in the circumferential direction so that the phase difference of vibration in the thickness direction between the at least one pair of brake disc plates becomes large. The vibration in the thickness direction of the plurality of brake disc plates is damped due to continuous contact and separation between the brake disc plates. Therefore, by setting the phase difference of vibration in the thickness direction between at least one pair of brake disc plates to be large, it is possible to improve the energy absorption when the pair of brake disc plates make contact with each other, thereby further effectively preventing the generation of noise such as brake noise.

It is also a preferred embodiment that the thicknesses of the at least one pair of brake disc plates are made different from each other, and the diameters of the at least one pair of brake disc plates are made different from each other as the specifications. With such configurations, it is possible to make the natural frequencies of the one pair of brake disc plates different from each other, and thereby reduce the number of resonance points. As a result, it is possible to effectively prevent the generation of brake noise.

Further, when the diameters of the brake disc plates are made different from each other, it is preferred that the at least one pair of brake disc plates include a first brake disc plate and a second brake disc plate, a sliding portion making sliding contact with a brake pad be formed on the first brake disc plate, and the second brake disc plate has a small enough diameter not to cover the sliding portion, and it is more preferred that the first brake disc plate be thicker than the second brake disc plate. More specifically, when a plurality of brake disc plates are laminated, the temperature on surfaces of the brake disc, the surfaces making sliding contact with the brake pad, becomes higher than the temperature on joined surfaces between the brake disc plates. Therefore, the brake disc plates may be warped due to the heat generated during braking. In the present invention, although the sliding portion that makes sliding contact with the brake pad is formed on the first brake disc plate, a sliding portion is not formed on the second brake disc plate. Accordingly, it is effectively prevent the brake disc plates from being warped due to the heat generated during braking. In addition, by setting the thickness of the first brake disc plate to be thick, it is possible to effortlessly set the thickness of the sliding portion to be thick. As a result, a sufficient braking performance can be ensured.

It is a preferred embodiment that at least one of the plurality of brake disc plates is warped, and the plurality of brake disc plates are laminated in such a manner that an outer peripheral part of the at least one brake disc plate is pressed against an adjacent brake disc plate. In the present invention, adjacent brake disc plates slide on each other during braking, thereby reducing the generation of noise such as brake noise. When the outer peripheral parts of the respective brake disc plates are pressed against each other as in the present invention, it is possible to increase the energy consumption when the brake disc plates slide on each other, thereby further effectively reducing the generation of noise such as brake noise.

It is also preferred that adjacent one pair of brake disc plates have the same structure with warpage, and the plurality of brake disc plates be laminated in such a manner that outer peripheral parts of the adjacent one pair of brake disc plates are pressed against each other.

Advantageous Effects of Invention

With the brake disc according to the present invention, when the sliding portion of the brake disc is sandwiched by the brake pad and braking force is applied thereto, adjacent brake disc plates slide on each other by vibration in the thickness direction, the circumferential direction, and the radial direction at this point, and the generation of noise such as brake noise is thereby reduced. In addition, since specifications relating to one or more selected from lightening holes, plate thickness, diameter, and warpage are different from each other between at least one pair of brake disc plates, it is possible to adjust the slide between the adjacent brake disc plates during braking and thereby effectively prevent the generation of noise such as brake noise without a complicated configuration of the brake disc. The lightening holes are preferably formed on the sliding portion with which the brake pad makes sliding contact. However, the lightening holes can also be formed on any portion other than the sliding portion. Further, it is also possible that specification such as the shapes or materials of the brake disc plates be made different from each other in addition to the specifications relating to lightening holes, plate thickness, diameter, or warpage. Further, these brake disc plates are partially joined so as to slide on each other by vibration during braking. For example, the brake disc plates are placed to overlap with each other, and can be joined with mounting bolts for mounting the brake disc to the wheel, with rivets or bolts, by welding, or by holding the outer peripheral part or the like of one of the brake disc plates in a folded back portion of another one of brake disc plates.

BRIEF DESCRIPTION OF THE DRAWINGS

FIGS. 1(a) to 1(c) illustrate a brake disc, wherein FIG. 1(a) is a front view, FIG. 1(b) is a rear view, and FIG. 1(c) is a cross-sectional view taken along line I-I of FIG. 1(a).

FIGS. 2(a) and 2(b) illustrate a brake disc having another configuration, wherein FIG. 2(a) is a front view, and FIG. 2(b) is a cross-sectional view taken along line II-II of FIG. 2(a).

FIGS. 3(a) and 3(b) illustrate a brake disc having another configuration, wherein FIG. 3(a) is a front view, and FIG. 3(b) is a cross-sectional view taken along line III-III of FIG. 3(a).

FIGS. 4(a) and 4(b) illustrate a brake disc having another configuration, wherein FIG. 4(a) is a front view, and FIG. 4(b) is a cross-sectional view taken along line IV-IV of FIG. 4(a).

FIGS. 5(a) to 5(b) illustrate a brake disc having another configuration, wherein FIG. 5(a) is a front view, FIG. 5(b) is a cross-sectional view taken along line V-V of FIG. 5(a).

FIGS. 6(a) and 6(b) illustrate a brake disc having another configuration, wherein FIG. 6(a) is a front view, and FIG. 6(b) is a cross-sectional view taken along line VI-VI of FIG. 6(a).

FIGS. 7(a) and 7(b) illustrate a disc S of Comparative Example 1, wherein FIG. 7(a) is a front view, and FIG. 7(b) is a cross-sectional view taken along line VII-VII of FIG. 7(a).

FIG. 26(*a*) illustrates the mode shapes of the disc D3.00 at the natural frequency, and FIG. 26(*b*) illustrates the mode shapes of the disc D3.75 at the natural frequency.

FIG. 28(*a*) is a graph illustrating the relationship between frequency and the gain of the frequency transfer function of the disc D3.00, and FIG. 28(*b*) is a graph illustrating the relationship between frequency and the gain of the frequency transfer function of the disc D3.75.

DESCRIPTION OF EMBODIMENTS

Hereinafter, an embodiment of the present invention will be described with reference to the drawings.

First, a brake disc in which specifications of lightening holes are made different from each other between two brake disc plates will be described.

Figure 1:
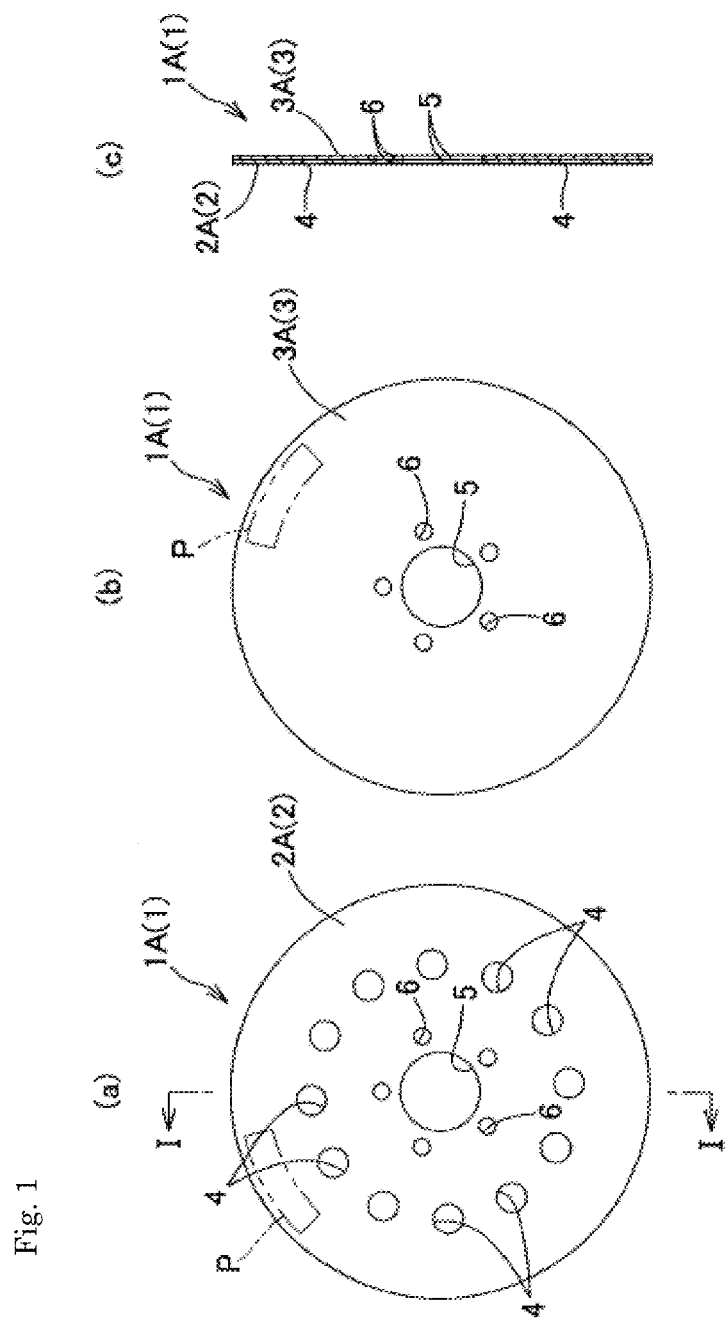

As shown in FIGS. 1(*a*) to 1(*c*), 2(*a*) and 2(*b*), and 3(*a*) and 3(*b*), a brake disc 1 is a brake disc for a two-wheeled motor vehicle, and includes two brake disc plates 2 and 3 which are laminated so as to slide on each other by vibration in the thickness direction, the circumferential direction, and the radial direction during braking. Lightening holes 4 are formed on at least one of the brake disc plates 2 and 3. Specifications of the lightening holes 4 are made different from each other between the brake disc plates 2 and 3.

Each of the brake disc plates 2 and 3 is composed of a generally discoid flat metal plate made of stainless steel or carbon steel having excellent heat resistance. The brake disc plates 2 and 3 are laminated with substantially no space therebetween. A through hole 5 into which an axle shaft is inserted is formed on the center of each of the brake disc plates 2 and 3. In addition, a plurality of mounting holes 6 are formed on each of the brake disc plates 2 and 3 so as to surround the through hole 5. The brake disc 1 is fixed to a hub of a wheel by inserting bolts into the respective mounting holes 6. Although five mounting holes 6 are formed on each of the brake discs 1 shown in FIGS. 1(*a*) to 1(*c*), 2(*a*) and 2(*b*), and 3(*a*) and 3(*b*), any number other than five of mounting holes 6 can be formed on the brake disc 1.

A sliding portion is formed on the outer peripheral part of the brake disc 1 so as to face a brake pad P of a braking device.

The sliding portion of the brake disc 1 is sandwiched by the brake pad P, and braking force is thereby applied to the wheel through the brake disc 1. A lining layer having excellent wear resistance is preferably formed integrally with the sliding portion.

The brake disc plates 2 and 3 are partially joined so as to slide on each other by vibration during braking. Specifically, the brake disc plates 2 and 3 are placed to overlap with each other, and can be joined together with mounting bolts for mounting the brake disc 1 to the wheel, with rivets or bolts, by welding, or by holding the outer peripheral part or the like of one of the brake disc plates in a folded back portion of the other brake disc plate.

The lightening holes 4 are formed on at least one of the brake disc plates 2 and 3. The number of the lightening holes 4, the shapes of the lightening holes 4, the sizes of the lightening holes 4, and the arrangement positions of the lightening holes 4 may be appropriately set. Further, the lightening holes 4 are preferably formed on the sliding portion with which the brake pad P makes sliding contact. However, the lightening holes 4 can also be formed on any portion other than the sliding portion.

The specifications of the lightening holes 4 are made different from each other between the brake disc plates 2 and 3. Specifically, specifications regarding one or more selected from the number of the lightening holes 4, the shapes of the lightening holes 4, the sizes of the lightening holes 4, and the arrangement positions of the lightening holes 4 can be made different from each other between the brake disc plates 2 and 3. In this regard, making the number of the lightening holes 4 different from each other includes two configurations where the lightening holes 4 are formed on both of the brake disc plates 2 and 3 and the number of the lightening holes 4 formed on the brake disc plate 2 is set to be different from that on the brake disc plate 3, and where the lightening holes 4 are formed only on one of the brake disc plates 2 and 3 and no lightening hole 4 is formed on the other one of the brake disc plates 2 and 3. Further, making the arrangement positions of the lightening holes 4 different from each other between the brake disc plates 2 and 3 includes a case where the lightening holes 4 are formed on the two brake disc plates 2 and 3 so that the positions of the lightening holes 4 in the radial direction or the circumferential direction in the brake disc plate 2 are different from those in the brake disc plate 3, and also a case where the arrangement positions of the lightening holes 4 are set to be the same in both of the brake disc plates 2 and 3, and the brake disc plates 2 and 3 are used by laminating the brake disc plates 2 and 3 in such a manner that the phases of the lightening holes 4 in the brake disc plate 2 are displaced by a certain angle in the circumferential direction relative to the phases of the lightening holes 4 in the brake disc plate 3.

In any cases where any specifications of the lightening holes 4 made different from each other, it is preferred to set the specifications of the lightening holes 4 so that an average value of the phase differences of vibration in the thickness direction of the brake disc plates 2 and 3 at respective portions in the circumferential direction becomes large as far as possible in order to prevent brake noise. More specifically, both of the brake disc plates 2 and 3 vibrate in the thickness direction, the circumferential direction, and the radial direction during braking. The vibration in the thickness direction of the brake disc plates 2 and 3 is damped due to continuous contact and separation between the brake disc plates 2 and 3. Therefore, by setting the phase difference of vibration in the thickness direction between the brake disc plates 2 and 3 to be large, it is possible to improve the energy absorption when the brake disc plates 2 and 3 make contact with each other, thereby further effectively preventing the generation of noise such as brake noise.

As specific examples of the brake disc plates 2 and 3 which constitute the brake disc 1, a discoid brake disc plate 2A that has twelve circular lightening holes 4 and a discoid brake disc plate 3A that has no lightening hole 4 can be employed as in a brake disc 1A shown in FIGS. 1(*a*) to 1(*c*). The brake disc plate 2A and the brake disc plate 3A have the same structure excepting the presence or absence of the lightening holes 4.

Figure 2:
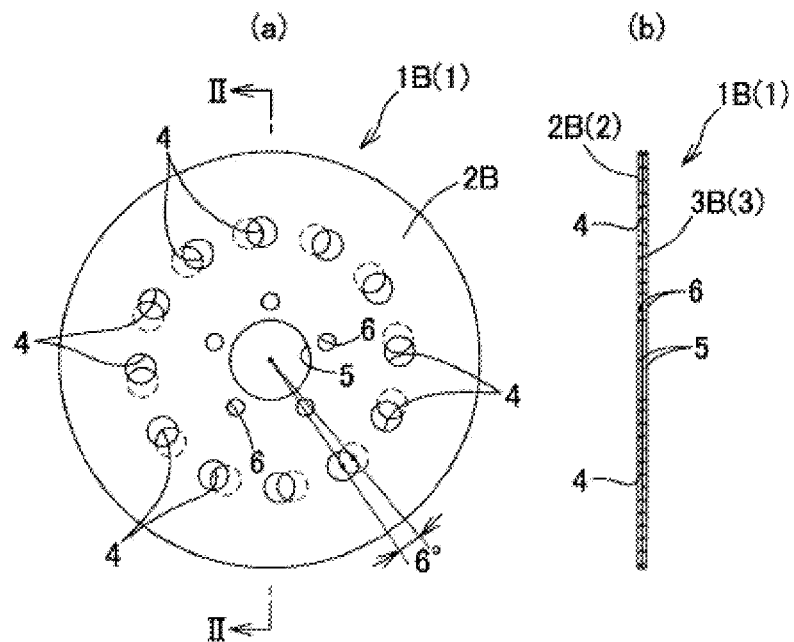

Further, as in a brake disc 1B shown in FIGS. 2(*a*) and 2(*b*), it is also possible to employ brake disc plates 2B and 3B each of which has twelve circular mounting holes 6 formed at regular intervals in the circumferential direction in such a manner that the phases of the lightening holes 4 of the brake disc plate 2B are displaced by 6° in the circumferential direction relative to the phases of the lightening holes 4 of the brake disc plate 3B with the positions of the mounting holes 6 of the brake disc plate 2B coinciding with the positions of the mounting holes 6 of the brake disc plate 3B. The brake disc plates 2B and 3B can be configured to have the same structure excepting that the phases of the lightening holes 4 are displaced by 6°.

Figure 3:
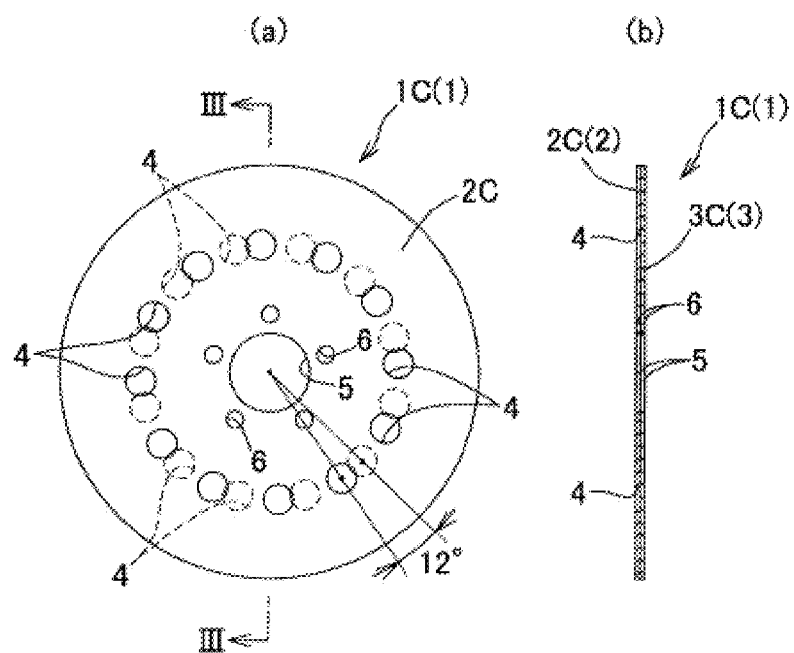

Further, as in a brake disc 1C shown in FIGS. 3(*a*) and 3(*b*), it is also possible to employ brake disc plates 2C and 3C each of which has twelve circular mounting holes 6 formed at regular intervals in the circumferential direction in such a manner that the phases of the lightening holes 4 of the brake disc plate 2C are displaced by 12° in the circumferential direction relative to the phases of the lightening holes 4 of the brake disc plate 3C with the positions of the mounting holes 6 of the brake disc plate 2C coinciding with the positions of the mounting holes 6 of the brake disc plates 3C. The brake disc plates 2C and 3C can be configured to have the same structure excepting that the phases of the lightening holes 4 are displaced by 12°.

Next, a brake disc 1 in which specifications other than the specifications of the lightening holes 4 are made different from each other between two brake disc plates will be described.

Specifications that can be made different from each other between the brake disc plates other than the specifications of the lightening holes 4 include specifications of the thickness, the diameter, and the warpage. That is, specifications relating to one or more selected from the lightening holes 4, plate thickness, diameter, and warpage can be made different from each other between the brake disc plates 2 and 3.

Figure 4:
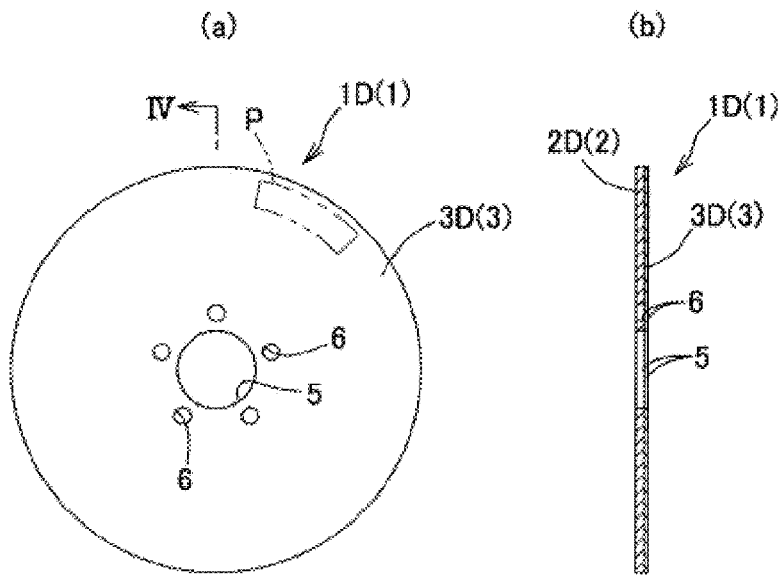

When making the thicknesses different from each other between the brake disc plates, as in a brake disc 1D shown in FIGS. 4(*a*) and 4(*b*), the thickness of one brake disc plate, or a brake disc plate 2D, is set to be smaller than the thickness of the other brake disc plate, or a brake disc plate 3D. In this case, it is possible to make the natural frequencies of the brake disc plates 2D and 3D different from each other, and thereby reduce the number of resonance points when the brake disc plates 2D and 3D are laminated. As a result, it is possible to prevent the generation of brake noise.

Figure 5:
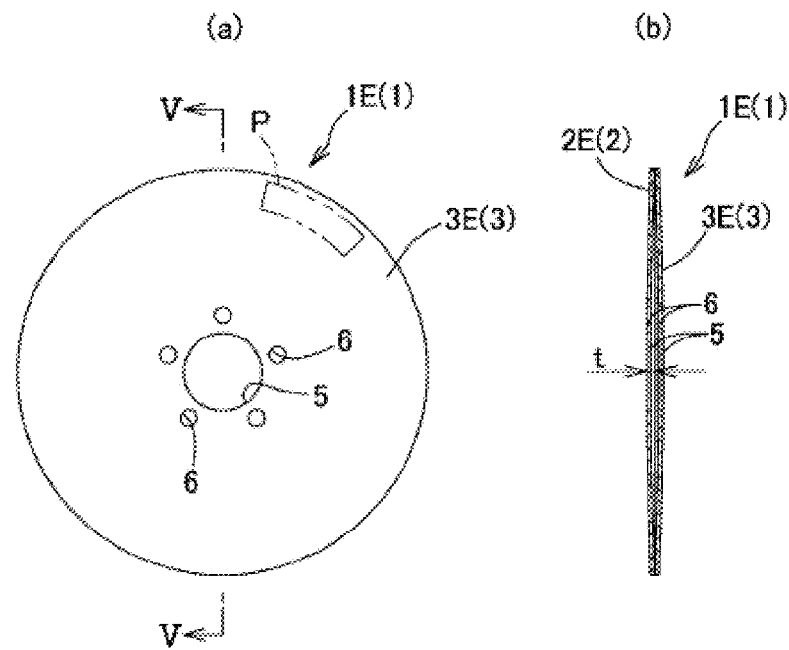

Further, when making the specifications relating to warpage different from each other between the brake disc plates, as in a brake disc 1E shown in FIGS. 5(*a*) and 5(*b*), each of brake disc plates 2E and 3E is warped so that a gap t in the thickness direction is formed between the outer peripheral part and the center thereof, and the brake disc plates 2E and 3E are placed to overlap with each other and joined into a flat plate in such a manner that the outer peripheral parts of the brake disc plates 2E and 3E are pressed against each other. In this case, since the outer peripheral parts of the brake disc plates 2E and 3E are pressed against each other, it is possible to increase the energy consumption in the outer peripheral parts when the brake disc plates 2E and 3E make sliding contact with each other, thereby effectively prevent the generation of brake noise.

When making the specifications relating to warpage different from each other between the brake disc plates, if the outer peripheral part of a warped brake disc plate is configured to be pressed against the adjacent brake disc plate, it is also possible, other than the above case where the brake disc plates 2E and 3E which are warped in opposite directions are used, to use a brake disc plate with warpage and a brake disc plate without warpage, use brake disc plates with warpages of different sizes, or use brake disc plates with warpages in different areas in the radial direction. In addition, it is also possible to set the configuration other than warpage, for example, to set the thickness of the outer peripheral part of one brake disc plate to be thick, or to fix a ring-shaped thin shim plate onto the outer peripheral part of the one brake disc plate to thereby allow the outer peripheral part of the one brake disc plate to be pressed against the adjacent other brake disc plate.

Figure 6:
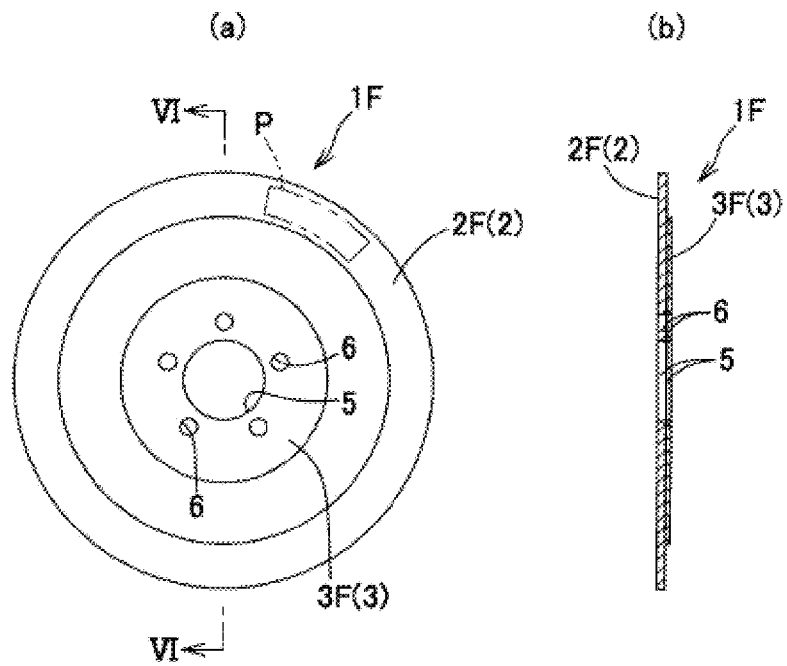

When the diameter of the brake disc plate 2 is set to be the same as the diameter of the brake disc plate 3 as in the brake disc 1, a temperature difference occurs between the sliding surfaces which make sliding contact with the brake pad P and the joined surfaces of the brake disc plates 2 and 3 corresponding thereto. Accordingly, the brake disc plates 2 and 3 are prone to be thermally deformed. In view of this, as in a brake disc 1F shown in FIGS. 6(a) and 6(b), it is possible to use a first brake disc plate 2F that has a sliding portion which makes sliding contact with the brake pad P on the outer peripheral part thereof and has a thick flat shape without warpage, and a second brake disc plate 3F that has a small enough diameter not to cover the sliding portion of the first brake disc plate 2F so that the second brake disc plate 3F does not make contact with the brake pad P. In this case, since the brake disc plates 2F and 3F having different diameters are laminated, it is possible to make the natural frequencies of the brake disc plates 2F and 3F different from each other, and thereby reduce the number of resonance points. As a result, it is possible to prevent the generation of brake noise. In addition, since the sliding portion is formed only on the first brake disc plate 2F, and the second brake disc plate 3F therefore does not make contact with the brake pad P, it is possible to reduce the temperature difference between the joined surfaces of the brake disc plates 2F and 3F and the outer surfaces thereof, and thereby prevent the brake disc plates 2F and 3F from being warped due to the temperature difference. In particular, the second brake disc plate 3F to be used is preferably thinner than the first brake disc plate 2F and warped, and the second brake disc plate 3F is preferably warped so that the outer peripheral part thereof is pressed against the first brake disc plate 2F. In this case, since the brake disc plates 2F and 3F having different diameters and different thicknesses are laminated, it is possible to make the natural frequencies of the brake disc plates 2F and 3F different from each other, and thereby reduce the number of resonance points. As a result, it is possible to prevent the generation of brake noise. In addition, since the outer peripheral part of the second brake disc plate 3F is pressed against the first brake disc plate 2F, it is possible to increase the energy consumption when the brake disc plates 2F and 3F make sliding contact with each other. As a result, it is possible to further effectively prevent the generation of brake noise.

In the present embodiment, the two brake disc plates 2 and 3 are laminated to form the brake disc 1. However, it is also possible to laminate three or more brake disc plates to form the brake disc 1. In this case, specifications relating to one or more selected from lightening holes, plate thickness, diameter, and warpage are made different from each other between at least one pair of brake disc plates. Further, the present invention can also be easily applied to a floating brake disc that is provided with a sliding disc, a hub disc which is attached to the inside of the sliding disc, a plurality of connectors which connect the sliding disc and the hub disc to each other in a floating state by constructing the sliding disc with two brake disc plates. Furthermore, the present invention can also be applied to a brake disc for a motor vehicle in the same manner as above.

Next, a performance evaluation test for a brake disc in which the specifications of lightening holes are made different from each other between brake disc plates will be described.

First, brake discs having the following configurations were manufactured as test discs.

As a brake disc of Example 1, a disc DM that includes two brake disc plates 2A and 3A as the brake disc 1A shown in FIGS. 1(a) to 1(c) was manufactured. Specifically, there were manufactured two discoid stainless steel metal plates each of which is 292 mm in outer diameter and 3 mm in thickness, has a thorough hole 5 having a diameter of 56 mm which is formed on the center thereof, and has five mounting holes 6 each having a diameter of 12 mm which are formed on the circumference of a circle having a radius of 41 mm at regular intervals in the circumferential direction thereof. Further, twelve lightening holes 4 each having a diameter of 20 mm were formed on the circumference of a circle having a radius of 90 mm at regular intervals in the circumferential direction in one of the metal plates to thereby manufacture the brake disc plate 2A. The other metal plate was used as the brake disc plate 3A as it is without forming a lightening hole 4 thereon. Then, the brake disc plates 2A and 3A were placed to overlap with each other, and bolts were then inserted into the respective mounting holes 6 to thereby integrally join the brake disc plates 2A and 3A without a gap therebetween, so that the disc DM can be obtained.

As a brake disc of Example 2, a disc D6 that includes two brake disc plates 2B and 3B as the brake disc 1B shown in FIGS. 2(a) and 2(b) was manufactured. Specifically, there were manufactured the brake disc plate 2B having the same configuration as that of the brake disc plate 2A of Example 1, and the brake disc 3B which has lightening holes 4 formed thereon so as to be displaced by 6° in the circumferential direction relative to the respective lightening holes 4 of the brake disc plate 2B. Then, the brake disc plates 2B and 3B were placed to overlap with each other, and bolts were then inserted into the respective mounting holes 6 to thereby integrally join the brake disc plates 2B and 3B without a gap therebetween, so that the disc D6 can be obtained.

As a brake disc of Example 3, a disc D12 that includes two brake disc plates 2C and 3C as the brake disc 1C shown in FIGS. 3(a) and 3(b) was manufactured. Specifically, there were manufactured the brake disc plate 2C having the same configuration as that of the brake disc plate 2A of Example 1, and the brake disc plate 3C which has lightening holes 4 formed thereon so as to be displaced by 12° in the circumferential direction relative to the respective lightening holes 4 of the brake disc plate 2C. Then, the brake disc plates 2C and 3C were placed to overlap with each other, and bolts were then inserted into the respective mounting holes 6 to thereby integrally join the brake disc plates 2C and 3C without a gap therebetween, so that the disc D12 can be obtained.

Figure 7:
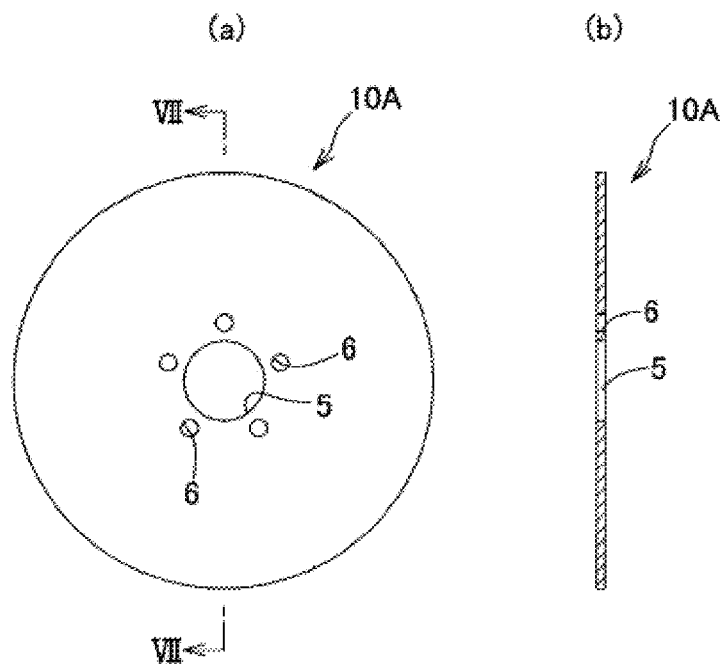

As a brake disc of Comparative Example 1, a disc S was manufactured in the following manner. As the disc 10A shown in FIGS. 7(a) and 7(b), the disc S is made of a discoid metal plate having an outer diameter of 292 mm and a thickness of 6 mm, has a through hole 5 having a diameter of 56 mm which is formed on the center thereof, and has five mounting holes 6 each having a diameter of 12 mm which are formed on the circumference of a circle having a radius of 41 mm at regular intervals in the circumferential direction thereof.

Figure 8:
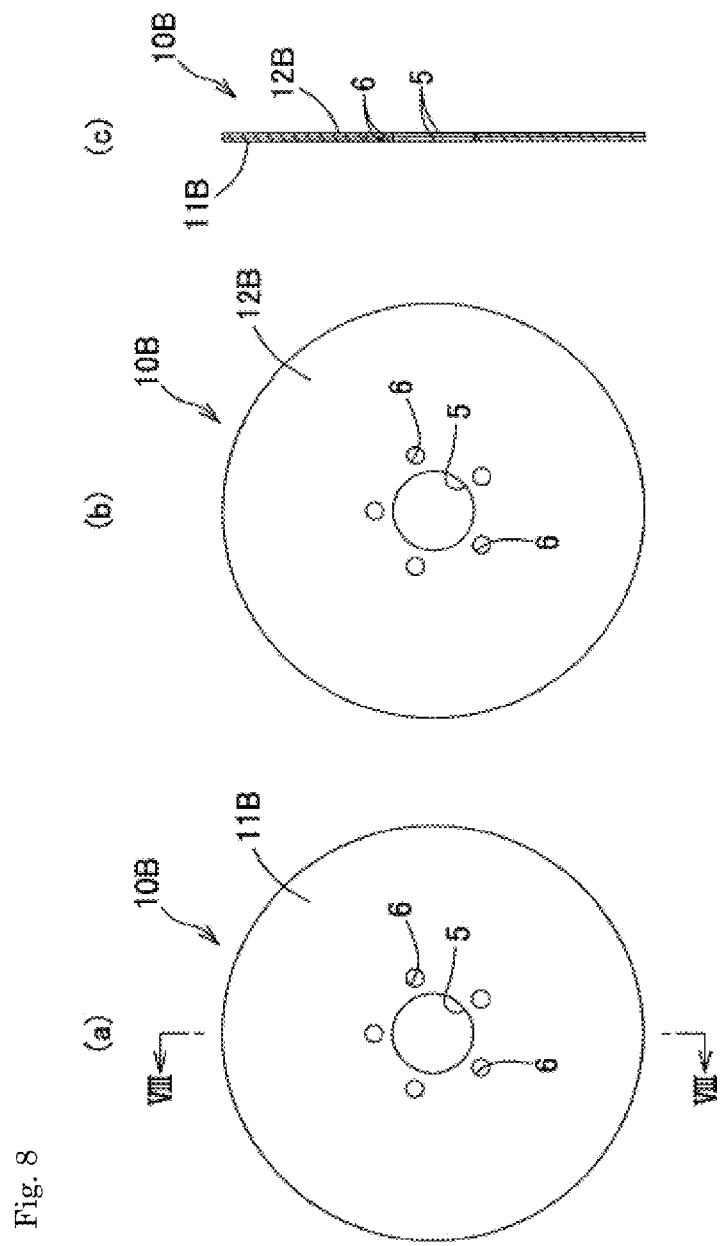
FIGS. 8(*a*) to 8(*c*) illustrate a disc D of Comparative Example 2, wherein FIG. 8(*a*) is a front view, FIG. 8(*b*) is a rear view, and FIG. 8(*c*) is a cross-sectional view taken along line VIII-VIII of FIG. 8(*a*).

As a brake disc of Comparative Example 2, a disc D was manufactured in the following manner. As the brake disc 10B shown in FIGS. 8(a) to 8(c), two brake disc plates 11B and 12B each having the same configuration as that of the brake disc plate 3A of Example 1 were manufactured. Then, the brake disc plates 11B and 12B were placed to overlap with each other, and bolts were then inserted into the respective mounting holes 6 to thereby integrally join the brake disc plates 11B and 12B without a gap therebetween, so that the disc D can be obtained.

Figure 9:
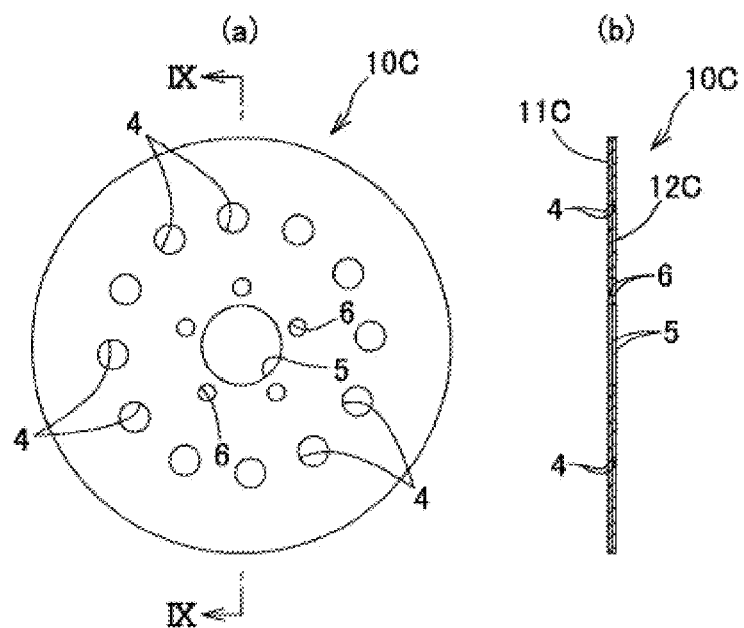
FIGS. 9(*a*) and 9(*b*) illustrate a brake D0 of a comparative example, wherein FIG. 9(*a*) is a front view, and FIG. 9(*b*) is a cross-sectional view taken along line IX-IX of FIG. 9(*a*).

As a brake disc of Comparative Example 3, a disc D0 was manufactured in the following manner. As the brake disc 10C shown in FIGS. 9(a) and 9(b), two brake disc plates 11C and 12C each having the same configuration as that of the brake disc plate 2A of Example 1 were manufactured. Then, the brake disc plates 11C and 12C were placed to overlap with each other, and bolts were then inserted into the respective mounting holes 6 to thereby integrally join the brake disc plates 11C and 12C without a gap therebetween, so that the disc D0 in which the phases of the lightening holes 4 of the brake disc plate 11C are not displaced relative to the phases of the lightening holes 4 of the brake disc plate 12C can be obtained.

(Hammering Test)

Figure 10:
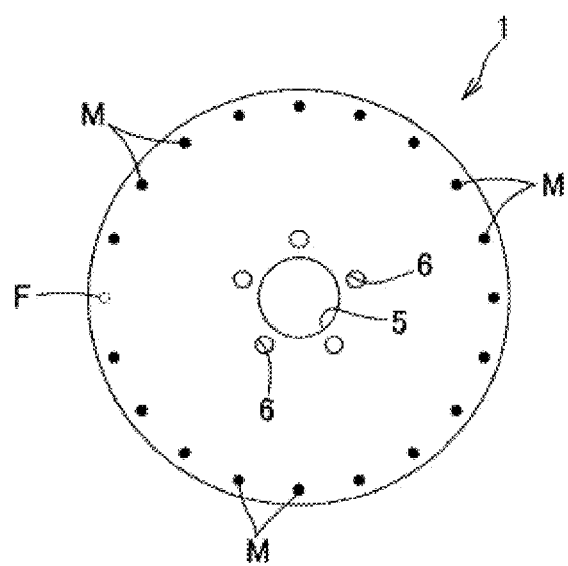
FIG. 10 is an explanatory drawing of a hammering test.

A supporting table in which a cylindrical fixing portion is provided so that the center axis thereof is substantially horizontal was used. The brake disc 1 was concentrically positioned in the fixing portion, and five bolts were inserted into the respective mounting holes 6 to thereby fix the brake disc 1 to the fixing portion. Further, as shown in FIG. 10, a position that lies on a horizontal line passing through the center of the brake disc 1 in the radial direction and is 131 mm away from the center was set as an excitation point F. Further, on the circumference of a circle passing through the excitation point F, the brake disc 1 is divided into 20 equal parts in the circumferential direction from the excitation point F as the base point, and 19 positions other than the excitation point F were set as measurement points M. Further, 38 acceleration sensors were provided on the front and back surfaces of the brake disc at the 19 measurement points M so as to be opposed to each other.

Then, the accelerations on the front and back surfaces at the 19 measurement points M of each of the brake discs when a shock is applied onto the excitation point F with a hammer were measured. The frequency response function (FRF) was calculated from the accelerations on the front and back surfaces at each of the measurement points M, and the damping ratio at the natural frequency was then calculated using a half-value width method. In this manner, the results shown in Table 1, and FIGS. 12 and 17 were obtained. In addition, the average of the damping constants was calculated for each of the brake discs, and the results shown in FIGS. 14 and 19 were thereby obtained.

Further, a frequency analysis was performed on the accelerations on the front and back surfaces at each of the measurement points M. Then, the phase difference between the front and back surfaces at each of the measurement points M was calculated on the basis of the phases at the natural frequency. In this manner, the results shown in Table 2, and FIGS. 13 and 18 were obtained. In addition, the average of the phase differences was calculated for each of the brake discs, and the results shown in FIGS. 15 and 20 were thereby obtained.

TABLE 1

Damping ratio average value

| Frequency (Hz) | Disc D (%) | Disc DM (%) | Disc D0 (%) | Disc D6 (%) | Disc D12 (%) | Frequency (Hz) | Disc S (%) |
|---|---|---|---|---|---|---|---|
| 780 | 0.191 | 0.226 | 0.321 | 0.259 | 0.357 | 910 | 0.171 |
| 1180 | 0.177 | 0.358 | 0.187 | 0.203 | 0.161 | | |
| 1670 | 0.154 | 0.240 | 0.165 | 0.196 | 0.135 | 1565 | 0.075 |
| 2240 | 0.067 | 0.182 | 0.248 | 0.156 | 0.153 | 2380 | 0.113 |
| 2885 | 0.059 | 0.175 | 0.130 | 0.134 | 0.141 | | |
| 3610 | 0.112 | 0.174 | 0.091 | 0.158 | 0.172 | 3340 | 0.094 |
| 4405 | 0.087 | 0.137 | 0.135 | 0.152 | 0.152 | 4440 | 0.086 |
| 5270 | 0.119 | 0.315 | 0.129 | 0.161 | 0.201 | 5675 | 0.066 |
| 6210 | 0.156 | 0.236 | 0.178 | 0.261 | 0.311 | | |
| 7205 | 0.125 | 0.264 | 0.193 | 0.200 | 0.237 | 7045 | 0.082 |
| Average | 0.125 | 0.231 | 0.178 | 0.188 | 0.202 | Average | 0.098 |

TABLE 2

Phase difference average

| Frequency (Hz) | Disc D (deg) | Disc DM (deg) | Disc D0 (deg) | Disc D6 (deg) | Disc D12 (deg) |
|---|---|---|---|---|---|
| 780 | 9.4 | 49.1 | 6.8 | 20.4 | 24.8 |
| 1180 | 17.9 | 42.0 | 8.4 | 31.2 | 32.8 |
| 1670 | 15.6 | 31.6 | 14.2 | 23.9 | 26.5 |
| 2240 | 18.1 | 34.5 | 11.5 | 11.4 | 30.4 |
| 2885 | 24.4 | 29.7 | 13.6 | 19.9 | 28.8 |
| 3610 | 19.5 | 30.3 | 15.0 | 41.1 | 19.6 |
| 4405 | 19.6 | 45.2 | 17.6 | 21.4 | 27.3 |
| 5270 | 21.8 | 36.2 | 19.4 | 22.4 | 25.0 |
| 6210 | 23.2 | 54.8 | 13.8 | 23.7 | 24.6 |
| 7205 | 18.4 | 75.4 | 25.1 | 19.0 | 21.9 |
| Average | 18.8 | 42.9 | 14.5 | 23.4 | 26.2 |

(Brake Noise Test)

Figure 11:
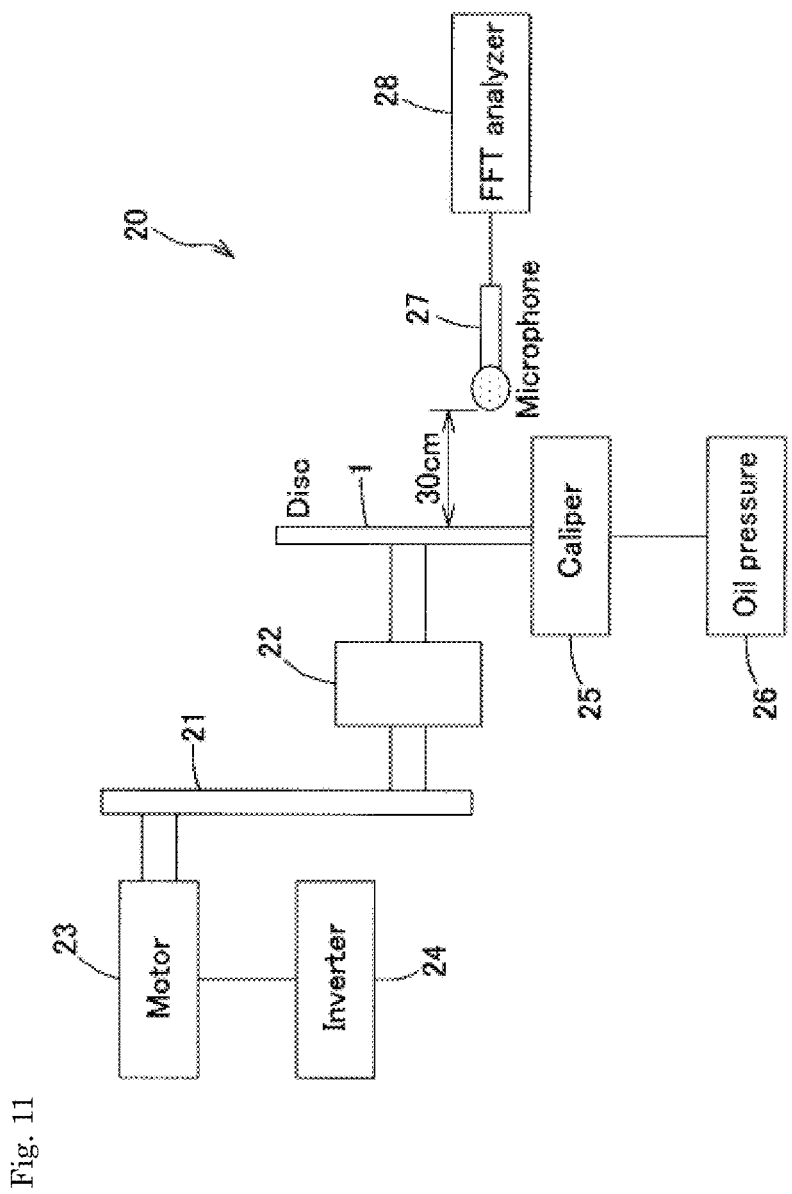
FIG. 11 is an explanatory drawing of a brake testing device.

A bench testing device 20 as shown in FIG. 11 was used as a testing device. The bench testing device 20 is provided with an alternating current (AC) motor 23 which rotationally drives the brake disc 1 through a belt 21 and an inertia 22, an inverter 24 which controls the rotational speed of the AC motor 23, a caliper 25 for applying braking force to the brake disc 1, a master cylinder 26 which supplies braking hydraulic pressure to the caliper 25, a microphone 27 which is provided at a position 30 cm away from the brake disc 1, and a Fast Fourier Transform (FFT) analyzer 28.

A pad of the caliper 25 was pressed against the brake disc 1 at 0.6 MPa while rotating the brake disc 1 at 10 rpm by the AC motor 23. The brake noise sound generated at this point was measured by the microphone 27, and the frequency analysis was performed using the FFT analyzer 28. After the brake noise sound was measured in this manner, the pressing of the pad was released, the brake disc 1 and the pad were then cooled, and a next brake noise sound was then measured. Such a measurement operation was repeatedly performed 50 times for each of the brake discs, and the results shown in Tables 3 and 4, and FIGS. 16 and 21 were thereby obtained.

TABLE 3

Noise sound pressure

| | Disc S | | Disc D | | Disc DM | |
|---|---|---|---|---|---|---|
| No. | Frequency (Hz) | Noise sound pressure (dB) | Frequency (Hz) | Noise sound pressure (dB) | Frequency (Hz) | Noise sound pressure (dB) |
| 1 | 14675 | 79.9 | 14600 | 61.3 | 14050 | 45.4 |
| 2 | 14675 | 81.4 | 14575 | 51.3 | 14000 | 46.6 |
| 3 | 14675 | 76.6 | 14550 | 43.0 | 13925 | 46.4 |
| 4 | 14675 | 71.0 | 14575 | 48.4 | 13925 | 47.4 |
| 5 | 14675 | 72.7 | 14550 | 46.1 | 14000 | 44.0 |
| 6 | 14675 | 77.4 | 14400 | 64.6 | 14025 | 38.2 |
| 7 | 14650 | 79.3 | 14550 | 52.7 | 13988 | 40.8 |
| 8 | 14675 | 73.2 | 14575 | 45.9 | 13988 | 32.0 |
| 9 | 14650 | 80.8 | 14400 | 52.8 | 13975 | 39.9 |
| 10 | 14625 | 67.9 | 14425 | 53.5 | 13913 | 38.2 |
| 11 | 14625 | 73.7 | 14425 | 59.6 | 14000 | 37.0 |
| 12 | 14625 | 81.2 | 14425 | 50.7 | 14000 | 37.0 |
| 13 | 14625 | 77.3 | 14600 | 52.7 | 13988 | 42.6 |
| 14 | 14625 | 73.8 | 14400 | 51.7 | 13950 | 34.9 |
| 15 | 14650 | 77.6 | 14425 | 54.2 | 13950 | 42.5 |
| 16 | 14650 | 75.8 | 14425 | 59.5 | 13938 | 44.1 |
| 17 | 14650 | 74.5 | 14575 | 64.3 | 13963 | 34.3 |
| 18 | 14650 | 78.8 | 14575 | 54.1 | 13925 | 34.6 |
| 19 | 14650 | 80.6 | 14575 | 45.3 | 13988 | 45.5 |
| 20 | 14650 | 78.2 | 14575 | 67.3 | 13975 | 37.4 |
| 21 | 14625 | 71.6 | 14575 | 43.2 | 13913 | 39.7 |
| 22 | 14625 | 75.0 | 14575 | 56.2 | 14075 | 45.2 |
| 23 | 14350 | 72.9 | 14575 | 54.5 | 13938 | 37.5 |
| 24 | 14625 | 73.5 | 14575 | 44.7 | 13938 | 35.7 |
| 25 | 14625 | 70.9 | 14425 | 48.4 | 14025 | 37.8 |
| 26 | 14400 | 70.1 | 14400 | 60.5 | 13988 | 38.4 |
| 27 | 14400 | 80.2 | 14400 | 58.6 | 14013 | 46.5 |
| 28 | 14425 | 72.7 | 14400 | 55.6 | 13963 | 42.3 |
| 29 | 14425 | 71.3 | 14400 | 39.6 | 14050 | 49.7 |
| 30 | 14400 | 79.6 | 14575 | 68.8 | 13925 | 38.6 |
| 31 | 14575 | 78.6 | 14400 | 54.1 | 14100 | 46.9 |
| 32 | 14375 | 86.7 | 14400 | 57.0 | 13950 | 46.7 |
| 33 | 14375 | 81.7 | 14375 | 51.9 | 14100 | 37.0 |
| 34 | 14375 | 78.2 | 14400 | 55.9 | 13950 | 46.5 |
| 35 | 14575 | 69.9 | 14400 | 52.5 | 13938 | 43.3 |
| 36 | 14600 | 76.0 | 14375 | 52.5 | 13975 | 36.3 |
| 37 | 14375 | 82.5 | 14400 | 61.5 | 13950 | 44.5 |
| 38 | 14375 | 85.2 | 14400 | 61.9 | 13988 | 36.2 |
| 39 | 14600 | 77.3 | 14400 | 60.3 | 14075 | 40.2 |
| 40 | 14575 | 74.9 | 14400 | 55.8 | 14075 | 42.5 |
| 41 | 14375 | 78.4 | 14425 | 41.4 | 14000 | 45.7 |
| 42 | 14400 | 81.7 | 14425 | 49.7 | 14025 | 40.7 |
| 43 | 14400 | 84.9 | 14400 | 47.2 | 14038 | 36.6 |
| 44 | 14375 | 80.6 | 14600 | 63.0 | 14000 | 46.2 |
| 45 | 14375 | 80.3 | 14600 | 46.0 | 13975 | 49.5 |
| 46 | 14375 | 81.5 | 14575 | 49.6 | 14000 | 35.0 |
| 47 | 14575 | 75.5 | 14600 | 56.6 | 14013 | 37.9 |
| 48 | 14575 | 75.1 | 14600 | 50.7 | 13963 | 46.0 |
| 49 | 14375 | 78.9 | 14600 | 56.1 | 13963 | 35.9 |
| 50 | 14375 | 75.7 | 14600 | 46.8 | 14025 | 35.0 |

TABLE 4

Noise sound pressure

| | Disc D0 | | Disc D6 | | Disc D12 | |
|---|---|---|---|---|---|---|
| No. | Frequency (Hz) | Noise sound pressure (dB) | Frequency (Hz) | Noise sound pressure (dB) | Frequency (Hz) | Noise sound pressure (dB) |
| 1 | 13950 | 50.2 | 13988 | 38.4 | 13950 | 32.7 |
| 2 | 14025 | 47.6 | 13950 | 38.0 | 13963 | 33.6 |
| 3 | 14075 | 42.5 | 14000 | 41.1 | 13975 | 33.1 |
| 4 | 14025 | 48.4 | 13975 | 46.8 | 13975 | 40.0 |
| 5 | 13975 | 41.7 | 14075 | 35.1 | 13950 | 36.7 |
| 6 | 13938 | 42.1 | 13938 | 39.3 | 13913 | 39.1 |
| 7 | 13988 | 46.9 | 14075 | 44.6 | 14013 | 33.7 |
| 8 | 14088 | 46.8 | 13975 | 40.4 | 13950 | 32.2 |
| 9 | 13950 | 49.2 | 14038 | 37.9 | 14000 | 32.4 |
| 10 | 14025 | 47.9 | 14038 | 45.3 | 14038 | 30.1 |
| 11 | 14038 | 52.6 | 14100 | 49.9 | 13975 | 44.0 |
| 12 | 14050 | 44.4 | 14025 | 50.6 | 13950 | 38.9 |
| 13 | 13988 | 59.0 | 14000 | 39.6 | 13925 | 35.5 |
| 14 | 14063 | 54.6 | 13988 | 44.3 | 13988 | 37.7 |
| 15 | 14075 | 43.6 | 13950 | 52.0 | 13925 | 40.1 |
| 16 | 14050 | 60.1 | 14038 | 47.6 | 14075 | 42.4 |
| 17 | 14025 | 57.2 | 14013 | 53.6 | 13975 | 34.9 |
| 18 | 13988 | 49.6 | 14000 | 40.7 | 13950 | 45.0 |
| 19 | 13950 | 51.5 | 13925 | 48.8 | 13963 | 48.7 |
| 20 | 14038 | 45.0 | 14088 | 56.6 | 14038 | 41.7 |
| 21 | 14100 | 43.7 | 14025 | 46.1 | 13988 | 38.1 |
| 22 | 14013 | 55.4 | 14075 | 42.6 | 13950 | 49.8 |
| 23 | 13925 | 53.2 | 14000 | 39.3 | 13975 | 39.9 |
| 24 | 14075 | 60.7 | 13975 | 43.8 | 13925 | 43.5 |
| 25 | 14063 | 42.6 | 14013 | 51.8 | 13950 | 40.7 |
| 26 | 13950 | 47.8 | 14075 | 45.0 | 13988 | 34.5 |
| 27 | 13988 | 58.2 | 13938 | 41.7 | 13938 | 42.6 |
| 28 | 14088 | 41.2 | 13988 | 37.5 | 13950 | 38.4 |
| 29 | 14025 | 54.0 | 14025 | 53.1 | 13925 | 39.8 |
| 30 | 14013 | 43.6 | 14038 | 49.6 | 13975 | 42.9 |
| 31 | 14025 | 49.3 | 13975 | 43.2 | 14013 | 48.6 |
| 32 | 13975 | 59.6 | 13950 | 36.4 | 14000 | 46.2 |
| 33 | 14038 | 45.2 | 14100 | 40.3 | 13988 | 37.5 |
| 34 | 14100 | 47.6 | 14013 | 43.9 | 13975 | 44.6 |
| 35 | 14025 | 55.2 | 13988 | 48.8 | 13950 | 33.1 |
| 36 | 13938 | 42.3 | 13938 | 51.2 | 14025 | 39.8 |
| 37 | 13988 | 53.9 | 14025 | 39.3 | 13963 | 44.7 |
| 38 | 14025 | 58.4 | 14050 | 55.0 | 14000 | 47.6 |
| 39 | 14050 | 51.3 | 14075 | 44.7 | 13925 | 40.3 |
| 40 | 14038 | 47.5 | 14000 | 37.6 | 13988 | 43.3 |
| 41 | 13975 | 49.0 | 13988 | 49.0 | 14025 | 50.0 |
| 42 | 14000 | 52.5 | 13950 | 53.5 | 14075 | 38.0 |
| 43 | 13950 | 56.8 | 14038 | 36.5 | 13975 | 37.4 |
| 44 | 14063 | 46.2 | 14000 | 40.3 | 13988 | 42.8 |
| 45 | 14025 | 50.6 | 13938 | 55.7 | 13950 | 40.7 |
| 46 | 14038 | 57.3 | 14013 | 50.2 | 14013 | 34.3 |
| 47 | 14088 | 47.6 | 14025 | 46.6 | 14063 | 47.6 |
| 48 | 13975 | 51.3 | 14038 | 36.8 | 14000 | 39.1 |
| 49 | 13938 | 43.6 | 14050 | 42.2 | 13950 | 42.1 |
| 50 | 14050 | 55.3 | 13988 | 50.6 | 13988 | 43.3 |

Figure 12:
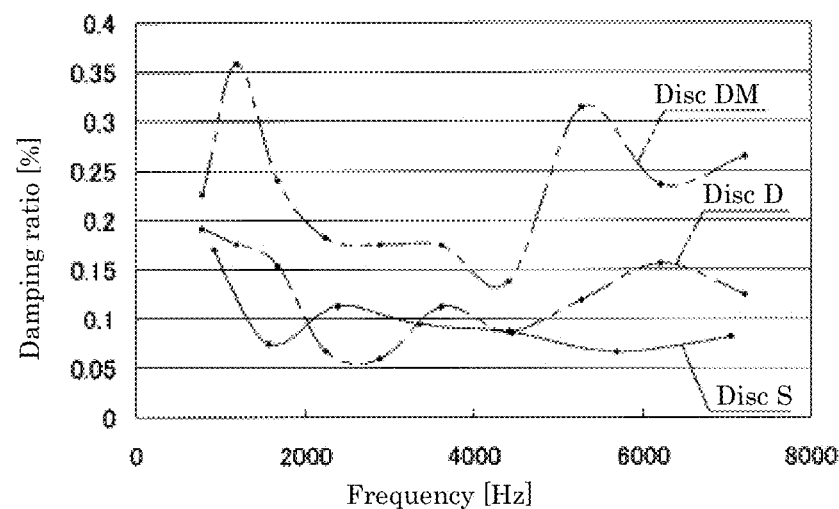
FIG. 12 is a graph illustrating the relationship between frequency and the damping ratio of each of the disc S, the disc D, and a disc DM.
Figure 13:
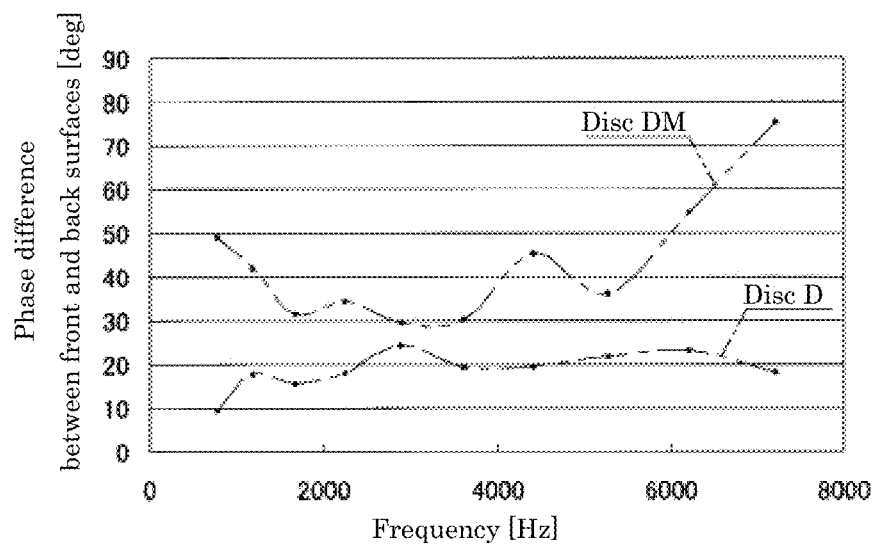
FIG. 13 is a graph illustrating the relationship between frequency and the phase difference of each of the disc D and the disc DM.
Figure 14:
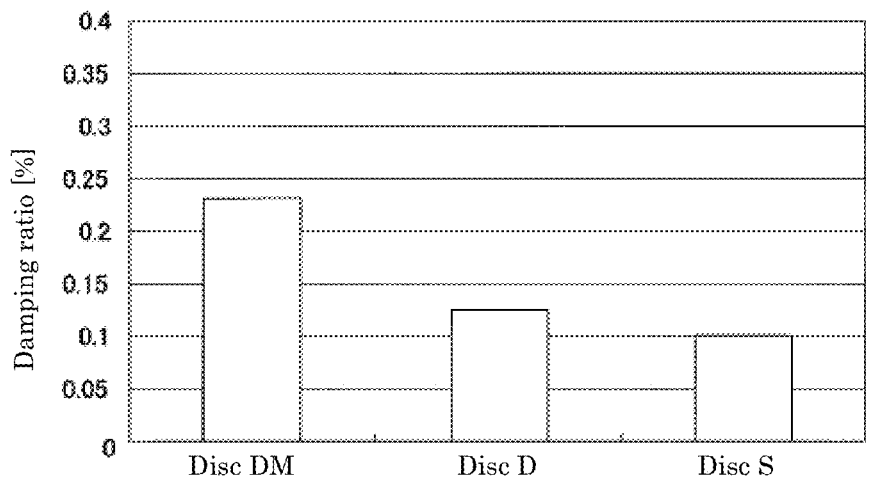
FIG. 14 is a bar graph illustrating the average value of the damping ratio of each of the disc S, the disc D, and the disc DM.
Figure 15:
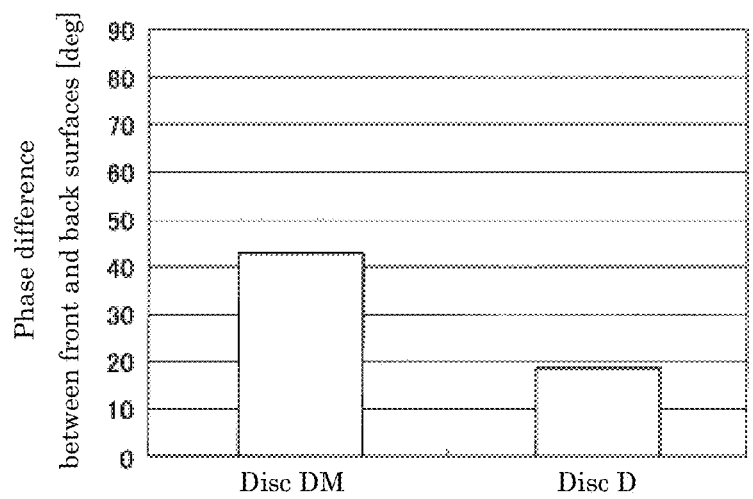
FIG. 15 is a bar graph illustrating the average value of the phase difference of each of the disc D and the disc DM.
Figure 16:
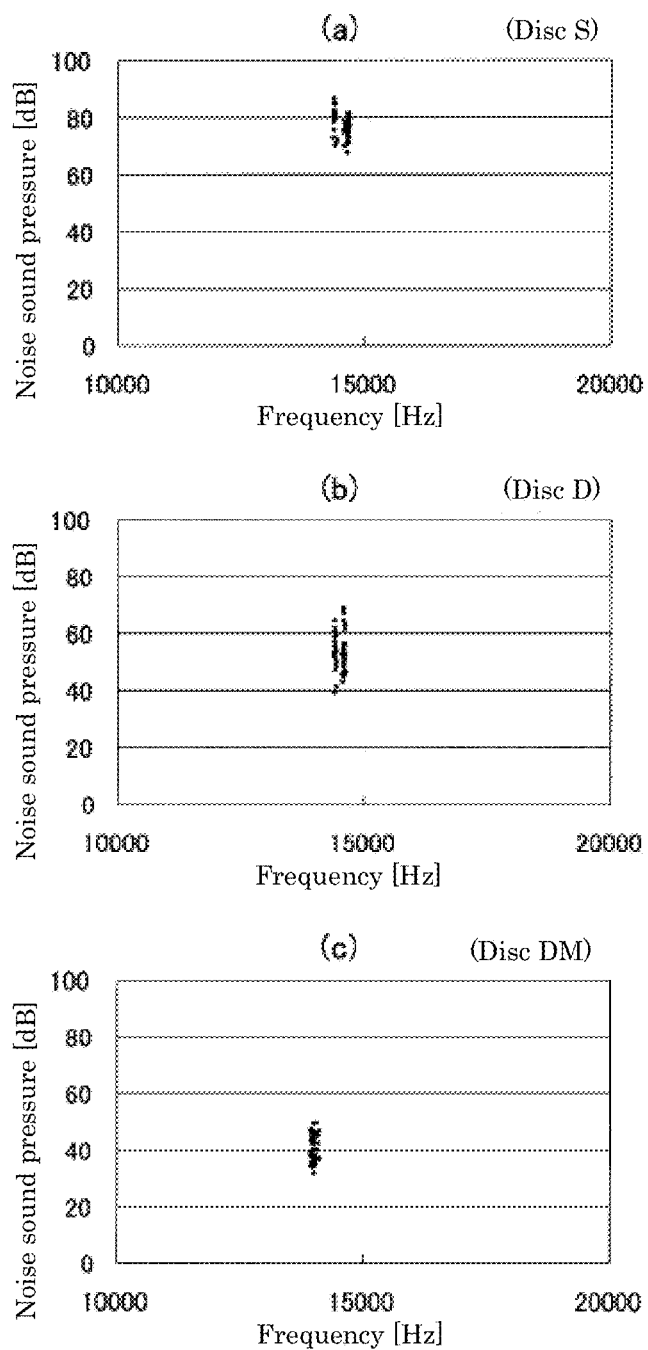
FIG. 16(*a*) is a graph illustrating the relationship between frequency and the noise sound pressure of the disc S, FIG. 16(*b*) is a graph illustrating the relationship between frequency and the noise sound pressure of the disc D, and FIG. 16(*c*) is a graph illustrating the relationship between frequency and the noise sound pressure of the disc DM.

FIGS. 12 and 14 show that the damping ratio is larger and the vibration is therefore more rapidly damped in the disc DM which is formed by laminating the brake disc plate having the lightening holes 4 and the brake disc plate having no lightening hole 4 than in the disc S which is composed of a single-layer brake disc and the disc D which is formed by laminating the two brake disc plates each having no lightening hole 4. Further, FIGS. 13 and 15 show that the disc DM has a larger phase difference of vibration in the thickness direction between the front and back surfaces thereof than the disc D. Furthermore, FIG. 16 shows that the sound pressure level of brake noise is low and brake noise is therefore reduced in the disc DM compared to the brake disc S and the brake disc D.

In other words, during braking, front and back brake disc plates vibrate in the thickness direction and slide on each other, thereby damping the vibration. By making the specifications of lightening holes 4 different from each other between the front and back brake disc plates such as presence or absence of a lightening hole 4, it is possible to set the phase difference of vibration in the thickness direction between the front and back brake disc plates and the damping ratio during braking to be large, thereby reducing brake noise.

Figure 17:
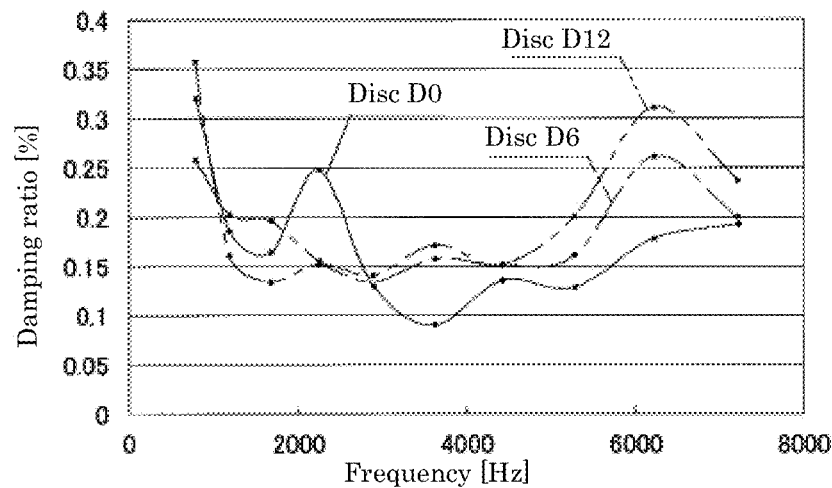
FIG. 17 is a graph illustrating the relationship between frequency and the damping ratio of each of the disc D0, a disc D6, and a disc D12.
Figure 18:
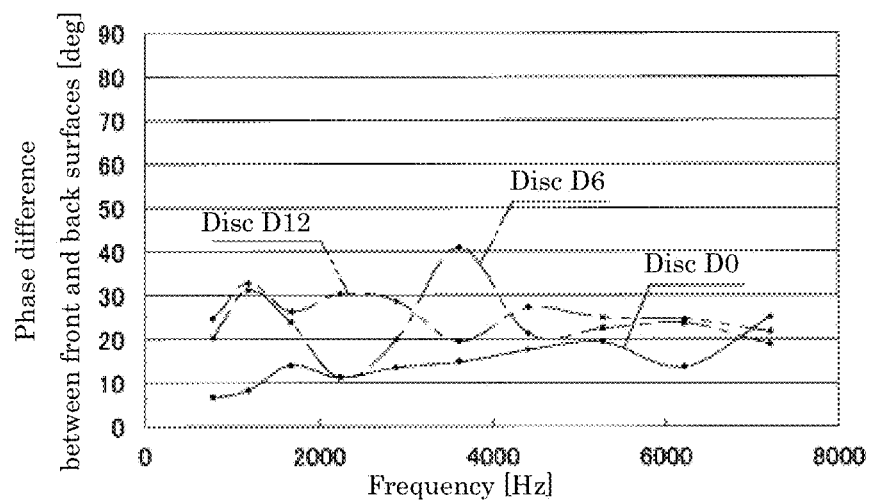
FIG. 18 is a graph illustrating the relationship between frequency and the phase difference of each of the disc D0, the disc D6, and the disc D12.
Figure 19:
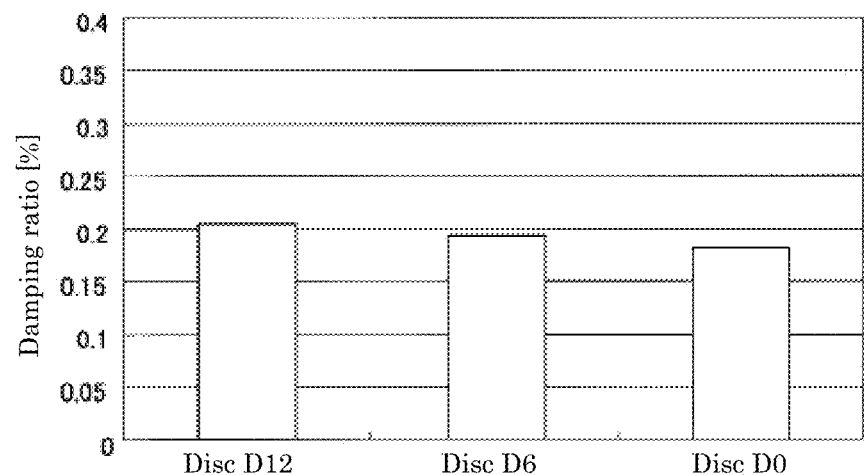
FIG. 19 is a bar graph illustrating the average value of the damping ratio of each of the disc D0, the disc D6, and the disc D12.
Figure 20:
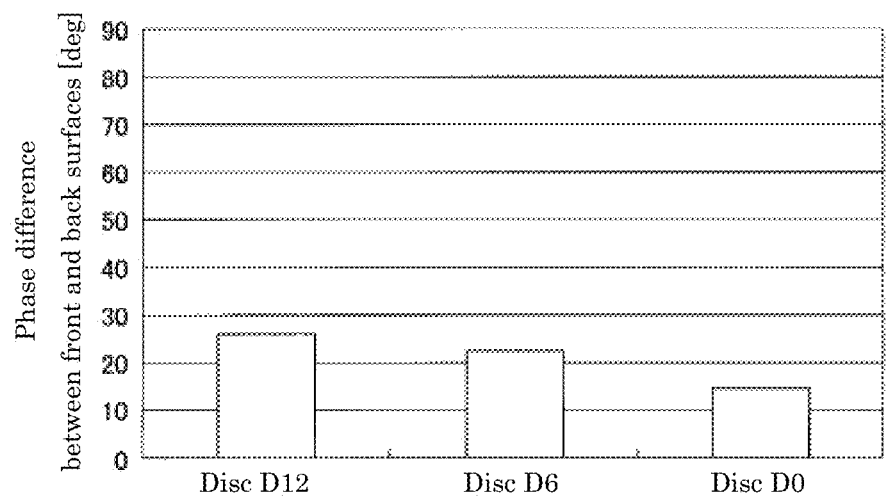
FIG. 20 is a bar graph illustrating the average value of the phase difference of each of the disc D0, the disc D6, and the disc D12.
Figure 21:
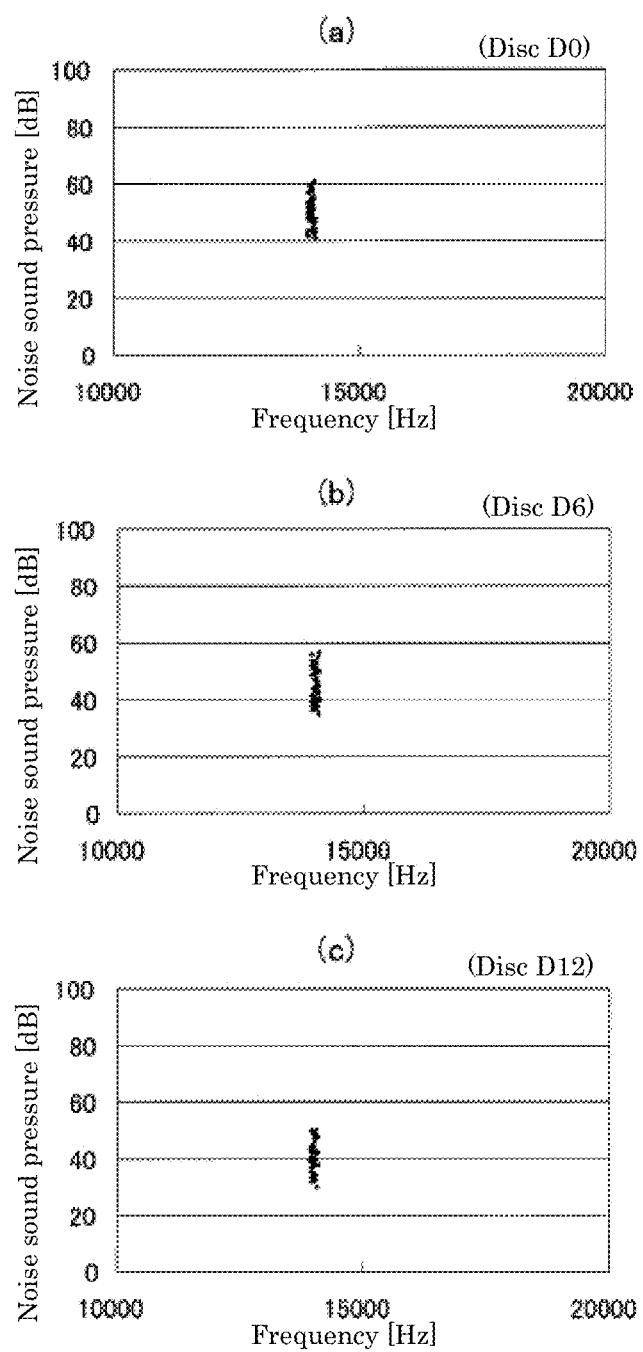
FIG. 21(*a*) is a graph illustrating the relationship between frequency and the noise sound pressure of the disc D0, FIG. 21(*b*) is a graph illustrating the relationship between frequency and the noise sound pressure of the disc D6, and FIG. 21(*c*) is a graph illustrating the relationship between frequency and the noise sound pressure of the disc D12.

Further, FIGS. 17 and 19 show that the damping ratio at a frequency band of 3000 Hz or higher is larger, and the vibration is therefore more rapidly damped in the disc D6 in which the phases of the lightening holes 4 in the front brake disc plate are displaced by 6° relative to those in the back brake disc plate and the disc D12 in which the phases of the lightening holes 4 in the front brake disc plate are displaced by 12° relative to those in the back brake disc plate than in the disc D0 in which the phases of the lightening holes 4 are not displaced between the front and back brake disc plates. Further, FIGS. 18 and 20 show that each of the disc D6 and the disc D12 has a larger phase difference of vibration in the thickness direction between the front and back surfaces thereof than the disc D0. Furthermore, FIG. 21 shows that the sound pressure level of brake noise is low and brake noise is therefore reduced in the discs D6 and D12 compared to the disc D0.

In other words, by displacing the phases of lightening holes 4 so that the phase difference of vibration in the thickness direction between front and back brake disc plates during braking becomes large, it is possible to set the sound pressure revel of brake noise to be low, thereby reducing brake noise.

Next, a performance evaluation test for a brake disc in which the thicknesses, warpages, or diameters are made different from each other between brake disc plates will be described.

First, brake discs having the following configurations were manufactured as test discs.

As a brake disc of Example 4, a disc D3.75 was manufactured in the following manner. As the brake disc 1D shown in FIGS. 4(*a*) and 4(*b*), there were manufactured a brake disc 2D having the same configuration as that of the brake disc plate 3A of Example 1 excepting that the thickness thereof is set to 3.75 mm, and a brake disc plate 3D having the same configuration as that of the brake disc plate 3A of Example 1 excepting that the thickness thereof is set to 2.25 mm. Then, the brake disc plates 2D and 3D were placed to overlap with each other, and bolts were then inserted into the respective mounting holes 6 to thereby integrally join the brake disc plates 2D and 3D without a gap therebetween, so that the disc D3.75 can be obtained.

As a brake disc of Example 5, a disc C0.4 was manufactured in the following manner. As the brake disc 1E shown in FIGS. 5(*a*) and 5(*b*), there were manufactured two brake disc plates 2E and 3E each of which has the same configuration as that of the brake disc plate 3A of Example 1. Each of the brake disc plates 2E and 3E was warped so that a gap t of 0.4 mm is formed in the thickness direction of each of the brake disc plates 2E and 3E, and a gap of 0.8 mm is formed between the center of the brake disc plate 2E and the center of the brake disc plate 3E when the outer peripheral edges of the brake disc plates 2E and 3E are placed to overlap with each other. Then, the brake disc plates 2E and 3E were placed to overlap with each other in such a manner that the outer peripheral parts thereof come into contact with each other, and bolts were then inserted into the respective mounting holes 6 to thereby integrally join the brake disc plates 2E and 3E without a gap therebetween, so that the disc C0.4 can be obtained.

A brake disc of Example 6, a disc MD was manufactured in the following manner. As the brake disc 1F shown in FIGS. 6(*a*) and 6(*b*), there were manufactured a brake disc plate 2F having the same configuration as that of the brake disc plate 3A of Example 1 excepting that the thickness thereof is set to 6 mm, and a brake disc plate 3F having the same configuration as that of the brake disc plate 3A of Example 1 excepting that the thickness thereof is set to 1 mm and the diameter thereof is set to 230 mm. Then, the brake disc plate 3F was warped so that a gap of 2 mm is formed between the center of the brake disc plate 2F and the center of the brake disc plate 3F when the brake disc plates 2F and 3F are placed to overlap with each other. Then, the brake disc plates 2F and 3F were placed to overlap with each other in such a manner that the outer peripheral part of the brake disc plate 3F comes into contact with the side surface of the brake disc plate 2F, and bolts were then inserted into the respective mounting holes 6 to thereby integrally join the brake disc plates 2F and 3F into a flat plate without a gap therebetween, so that the disc MD can be obtained.

As a brake disc of Example 7, a disc MDF that has the same configuration as that of the brake disc 1F of Example 6 excepting that the brake disc plate 3F is formed into a flat plate was used.

(Brake Noise Test)

The same bench testing device 20 as above was used. In the brake noise test, the rotational speed of each of the discs was kept constant at 30 rpm, the oil pressure was changed from 0.2 MPa to 1.0 MPa by every 0.2 Mpa, and the noise sound pressure at each contact pressure was recorded 10 times, namely, 80 times in total. A Hanning window was used as a window function in the FFT analysis of noise sound pressure, the sampling length was set to 2048, and the frequency range was set to 20000 Hz. Before performing the brake noise test, bedding was performed for keeping a uniform contact state of the disc with the pad. Each of the discs was sufficiently cooled after the test so that the surface temperature of the disc does not exceed 100° C. during the test.

(Hammering Test)

Each of the discs was excited in the thickness direction with an impulse hammer, and the acceleration at this point was measured using an acceleration pickup. In order to obtain the frequency response of each of the discs up to 20 kHz which is the upper limit of the human audible range, an impulse hammer that can excite a disc up to 20 kHz was selected. In order to estimate the boundary condition of each of the discs during braking, the test was performed with the disc restrained by the shaft of the brake testing device.

Figure 22:
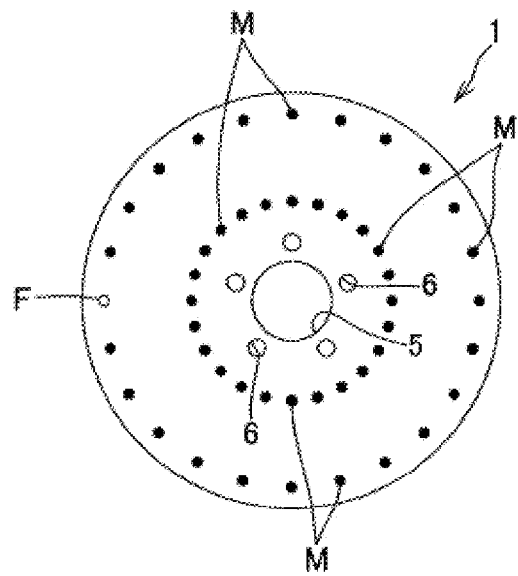
FIG. 22 is an explanatory drawing of a hammering test.

As shown in FIG. 22, the excitation point F to be excited by the impulse hammer is set at a position that lies on a horizontal line passing through the center of the brake disc 1 in the radial direction and is 130 mm away from the center. Further, on the circumference of a circle passing through the excitation point F, the brake disc 1 is divided into 24 equal parts in the circumferential direction from the excitation point F as the base point, and 23 positions other than the excitation point F were set as measurement points M. In addition, 24 positions that divide the circumference of a circle having a radius of 70 mm into 24 equal parts were also set as measurement points M. The accelerations on these 47 measurement points M were measured. When performing the test for a laminated disc, the accelerations on a surface opposite to the surface to be excited were also measured. Therefore, the accelerations at 95 positions in total were measured. When performing the test for a laminated disc that includes circular plates having different thicknesses, the surface of one of the circular plates having a larger thickness is used as an excitation surface. A force and exponential window was used as a window function in the FFT analysis of the hammering test, the sampling length was set to 4096, and the frequency range was set to 20000 Hz. In order to reduce the influence of noise, the frequency response functions obtained by the hammering were averaged five times. Further, the reliability of the five times hammerings was ensured using a coherence function. The measured gain of the frequency response function and phase were analyzed by the experimental mode analyzing soft wear ME' scope to thereby identify the mode shapes of the discs at the time of performing the hammering. Further, on the basis of the measurement result of the gain of the frequency response function, the damping ratio at each natural frequency was calculated using the following formula.

$$\xi = (\Delta f/2f) \times 100$$

In this formula, ξ, Δf, and 2f represent the damping ratio, the range of frequencies 3 dB below the resonant frequency, and the resonant frequency, respectively.

(Braking Test)

Coils of a high frequency induction heating apparatus were arranged so as to face appropriate positions on the sliding portion of the brake disc 1 in the circumferential direction and not to have contact with the brake disc 1. Then, the sliding portion was further heated using the high frequency induction heating apparatus while allowing the brake pad P to make sliding contact with the brake disc 1. Then, the deflection of the side surface of the brake disc 1 was measured by a digital dial gauge, and the temperature of the surface of the brake disc 1 was measured using a rotary thermocouple. The dial gauge was located on the contact surface which makes contact with the brake pad P at a position that lies on the circumference of a 262 mm diameter circle centered on the center of the contact surface. Further, the rotary thermocouple was attached to the contact surface at a position that lies on the circumference of the 262 mm diameter circle and a position that lies on the circumference of a 140 mm diameter circle. In the braking test, the rotational speed of each of the discs was 240 rpm, the oil pressure was 0.9 MPa, and the braking time was 180 s.

(Result of Brake Noise Test)

Figure 23:
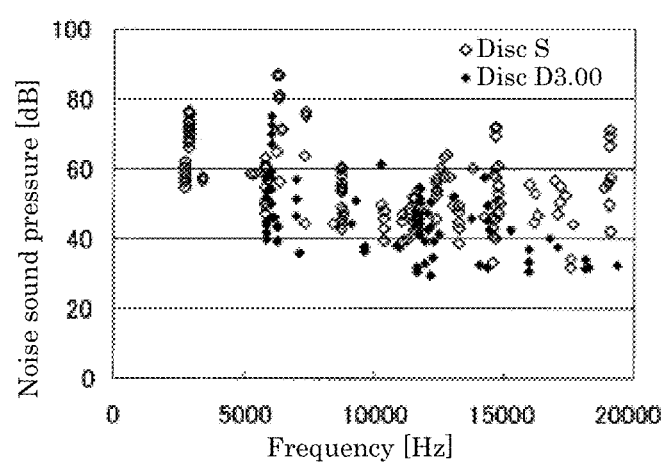
FIG. 23 is a graph illustrating the relationship between frequency and the noise sound pressure of each of the disc S and a disc D3.00.

FIG. 23 is a scatter diagram of the noise sound pressure levels of each of the disc S and the disc D3.00 obtained by the brake noise test. It could be confirmed that the frequencies of noise of each of the disc S and the disc D3.00 exist over a wide range, and the noise sound pressure levels of the disc D3.00 are totally reduced compared to those of the disc S. Further, brake noise was not generated in the disc D3.75 and the disc C0.4.

(Result of Hammering Test)

Figure 24:
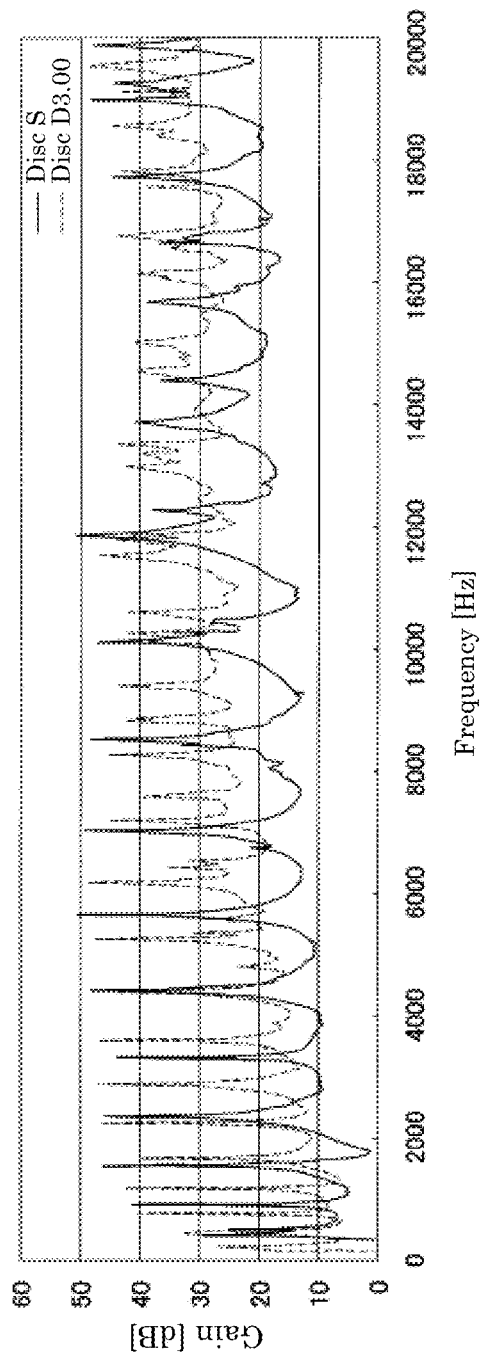
FIG. 24 is a graph illustrating the relationship between frequency and the gain of the frequency transfer function of each of the disc S and the disc D3.00.

FIG. 24 shows the gain of the frequency response function of each of the disc S and the disc D3.00 obtained by the hammering test. The average of the damping ratios at respective natural frequencies was 0.18% in the disc D3.00 and 0.14% in the disc S.

Figure 25:
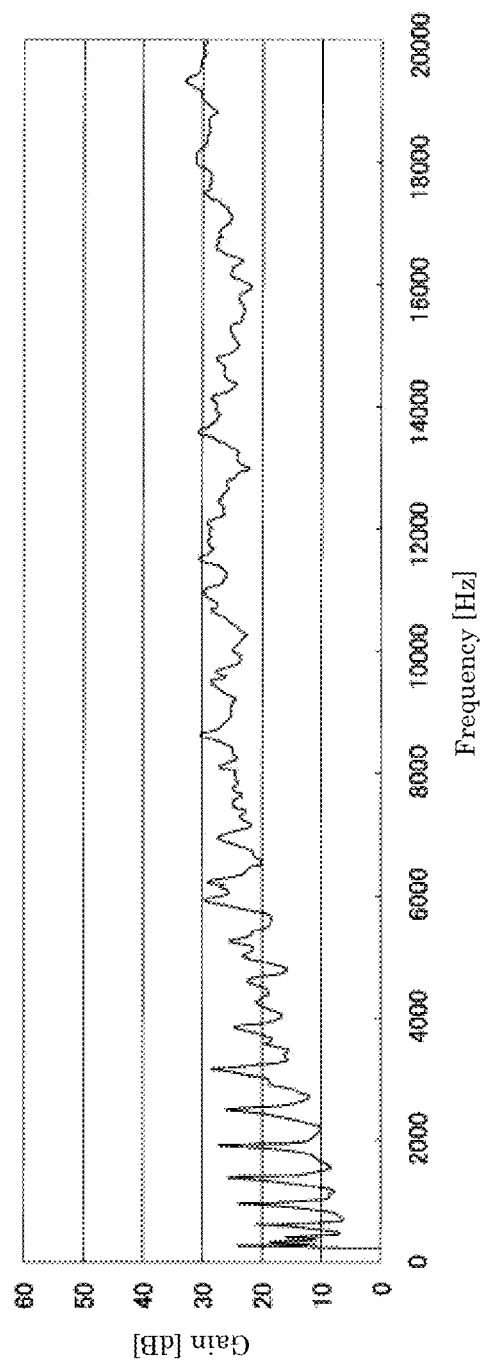
FIG. 25 is a graph illustrating the relationship between the frequency and the gain of the frequency transfer function of a disc D3.75.

The average value of the gains at respective natural frequencies was 43.4 dB in the disc S and 42.7 dB in the disc D3.00. Further, the damping ratio of the disc D3.00 was larger than that of the disc S which is formed by a single plate. It would appear that, in a laminated plate formed by laminating two plate members, since the phase difference occurs in vibration displacement between the front and back surfaces and impact damping thereby occurs as described above, the damping ratio of the disc D3.00 is improved, and the noise sound pressure is thereby reduced. However, as shown in FIG. 24, the number of resonance points of the disc D3.00 up to 20 kHz is larger than that of the disc S. In consideration of the actual use of a laminated disc, it is preferred that the number of resonance points of the laminated disc up to 20 kHz be smaller. Therefore, in order to vary the natural frequencies of respective circular plates of a laminated disc, a disc D3.75 that includes two circular plates having different thicknesses was manufactured. FIG. 25 shows the gain of the frequency response function of the disc D3.75. In the disc D3.00, clear resonance points could be confirmed up to 20 kHz. On the other hand, it could be confirmed that, in the disc D3.75, a clear resonance point does not exist in the range of 4 kHz to 20 kHz. FIG. 26 shows the mode shapes of the disc D3.00 and the disc D3.75 at the respective natural frequencies. In the disc D3.00, there was generally no difference between the mode shapes of the front and back surfaces up to 20 kHz. However, it turned out that, in the disc D3.75, there is a difference between the mode shapes of the front and back surfaces within the frequency range exceeding 4 kHz in which a clear resonance point does not exist.

In order to find out the cause of the decrease of the number of resonance points of the disc D3.75, the difference in phase between the acceleration obtained in the front surface (right surface) and the acceleration obtained in the back surface (left surface) of the laminated disc after applying exciting force thereto was examined. The phase difference was calculated using the following formula.

$$\Delta\Phi(f) = \Phi_{right}(f) - \Phi_{left}(f)$$

In this formula, ΔΦ represents the phase difference, $\Phi_{right}$ represents the phase of vibration of the right surface of the disc, $\Phi_{left}$ represents the phase of vibration of the left surface of the disc, and f represents the frequency.

Figure 27:
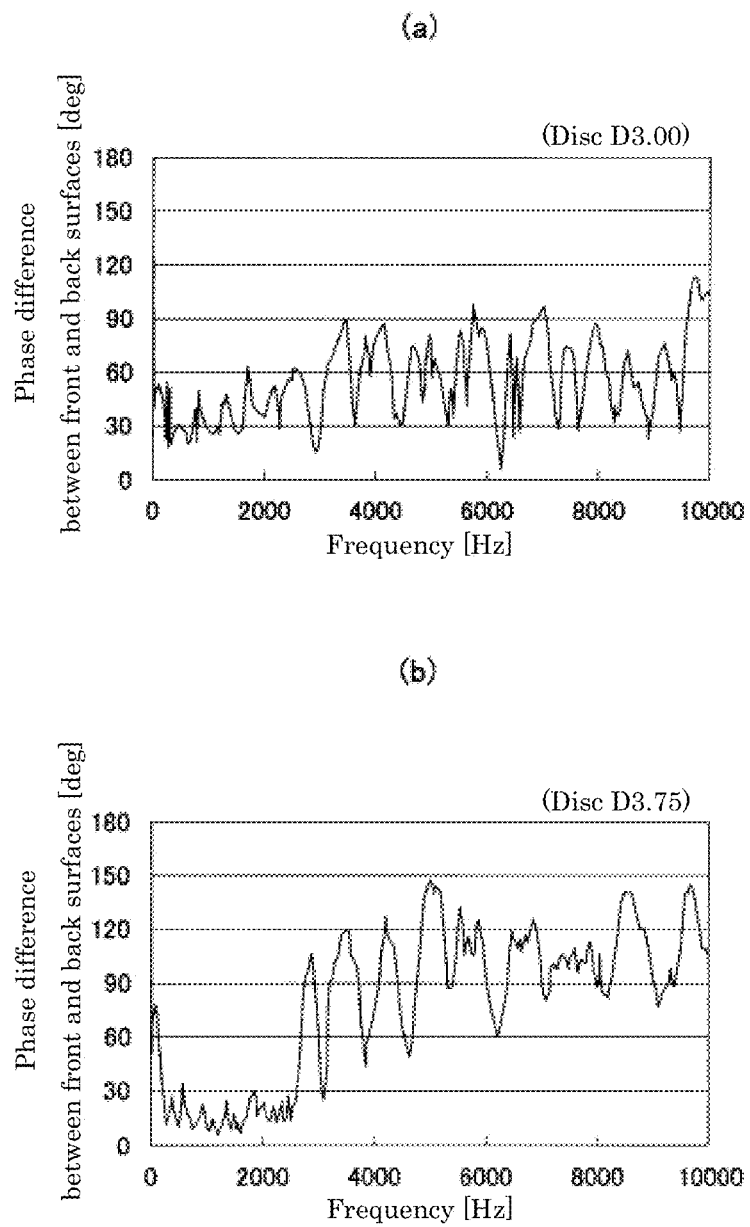
FIG. 27(*a*) is a graph illustrating the relationship between frequency and the phase difference between the front and back surfaces of the disc D3.00, and FIG. 27(*b*) is a graph illustrating the relationship between frequency and the phase difference between the front and back surfaces of the disc D3.75.
Figure 29:
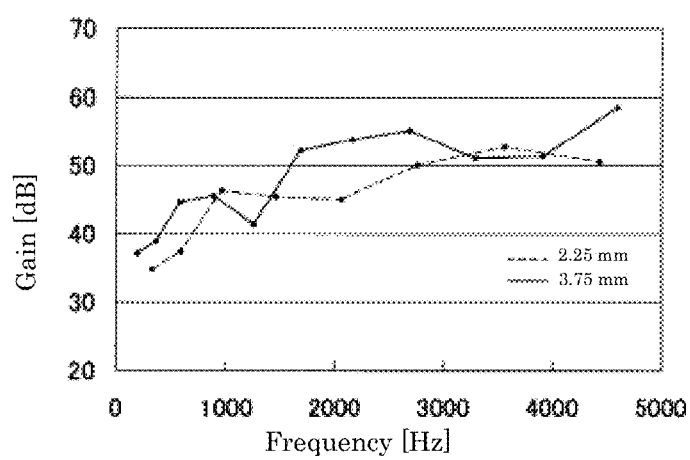
FIG. 29 is a graph illustrating the relationship between frequency and the gain of the frequency transfer function of each of two gasket plates of the disc D3.75.

Next, the phase differences at 23 points on the circumference of a circle having a diameter of 260 mm in the disc were calculated using the above formula, and the calculated phase differences were averaged. FIG. 27(*a*) shows the averaged phase difference of the disc D3.00 and FIG. 27(*b*) shows the averaged phase difference of the disc D3.75. It could be confirmed from FIGS. 27(*a*) and 27(*b*) that the phase difference is 30 deg and therefore small within the range up to 10 kHz in the disc D3.00, and, on the other hand, the phase difference is large within the range of 2.5 kHz to 10 kHz in the disc D3.75. Further, FIGS. 28(*a*) and 28(*b*) show the difference between the gains of the acceleration obtained in the right surface and the gains of the acceleration obtained in the left surface. It could be confirmed from FIGS. 28(*a*) and 28(*b*) that there is generally no difference between the gains of the front and back surfaces of the disc D3.00, and, on the other hand, there is a big difference between the gains of the front and back surfaces of the disc D3.75. Further, it turned out that although the natural frequencies of the respective circular plates themselves of the disc D3.75 are different from each other (FIG. 29), the natural frequencies of the respective front and back surfaces of the disc D3.75 are made equal to each other when the circular plates are joined with bolts (FIGS. 28(*a*) and 28(*b*)). These results indicate that there are differences in gain and phase between the front and back surfaces of the disc D3.75 despite the fact that both of the surfaces vibrate at the same frequency, which means that the two plates vibrate while violently colliding with each other. It would appear that the collision vibration leads to the increase of the damping ratio, and a clear resonance point therefore does not exist within the range of high frequency in the disc D3.75. As a result, brake noise was not generated when the disc 3.75 was used. As described above, the frequency response function of a laminated disc is improved compared to that of a conventional disc. However, opening displacement was confirmed between the layers, namely, between the brake disc plates of the laminated disc when the brake disc plates slides on each other. Accordingly, the effect of friction damping of the laminated disc may disappear when the brake disc plates slides on each other.

(Frequency Response Function of Disc Having Contact Initial Stress Applied Between Layers by Assembling)

Figure 30:
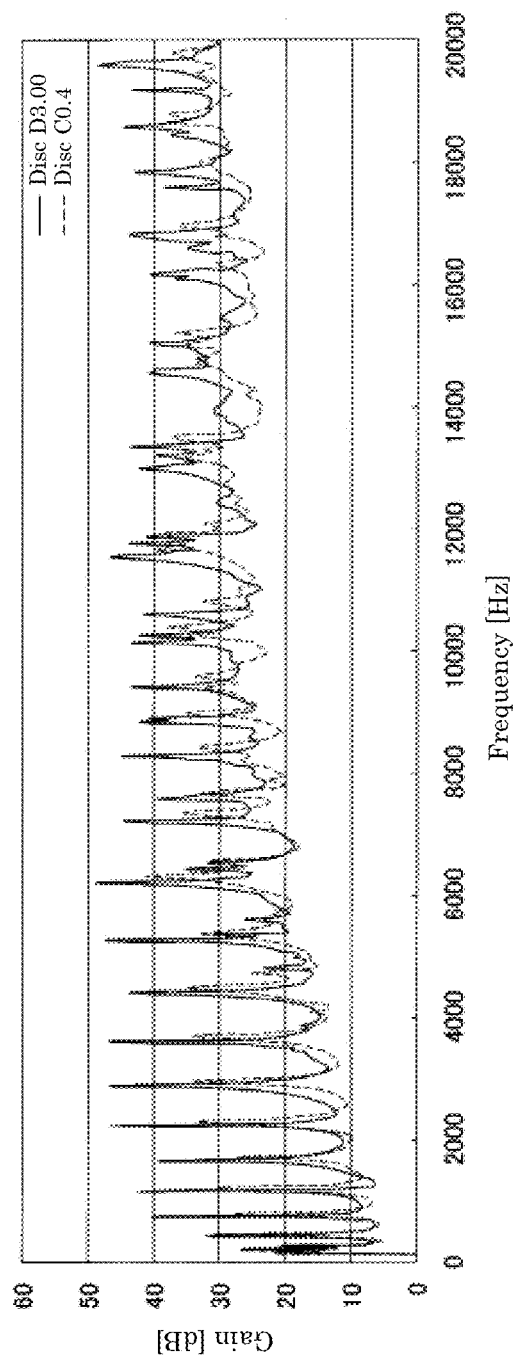
FIG. 30 is a graph illustrating the relationship between frequency and the gain of the frequency transfer function of each of the disc D3.00 and a disc C0.4.
Figure 31:
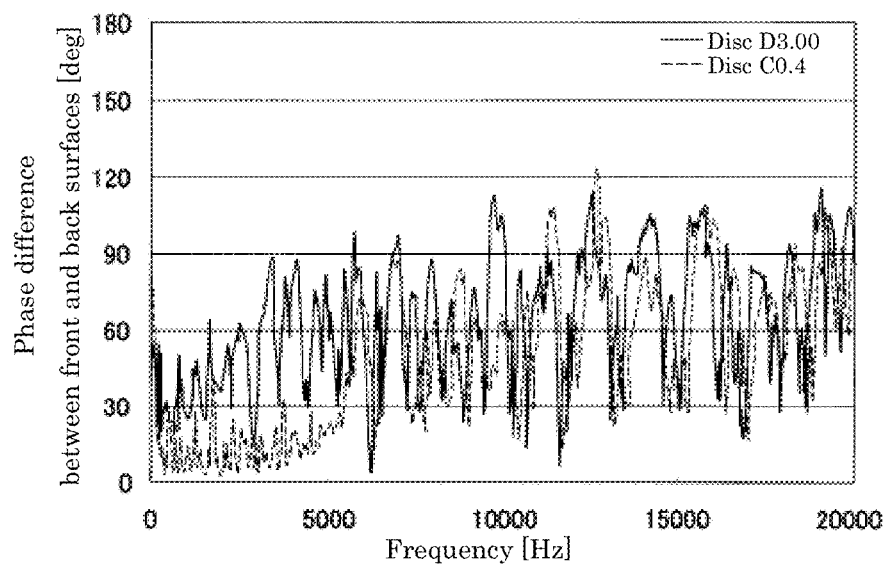
FIG. 31 is a graph illustrating the relationship between frequency and the phase difference between the front and back surfaces of each of the disc D3.00 and the disc C0.4.
Figure 32:
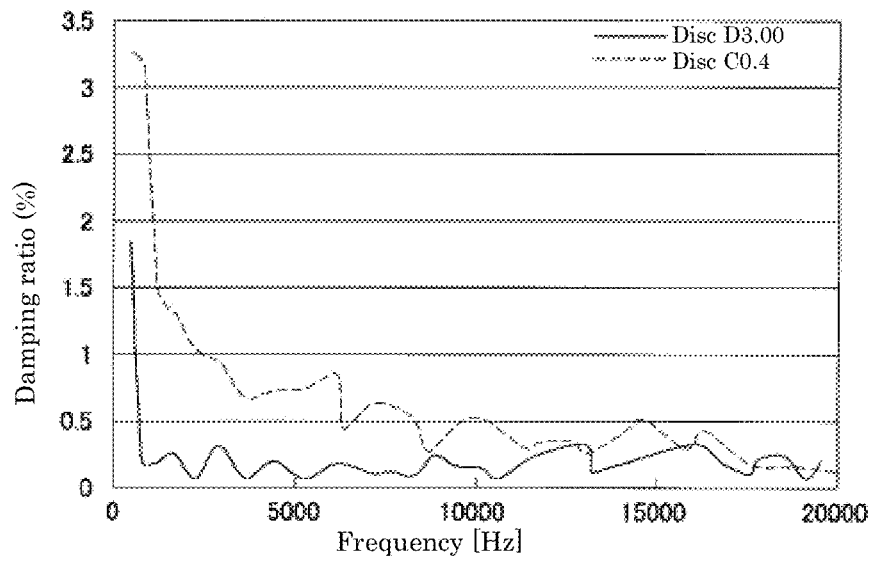
FIG. 32 is a graph illustrating the relationship between frequency and the damping ratio of each of the disc D3.00 and the disc C0.4.

In order to reduce the opening displacement between the layers of a laminated disc and further enhance the effect of preventing brake noise, a laminated disc (disc C0.4) having a shape that allows contact initial stress to be applied to the vicinity of the outer periphery of the disc by assembling was manufactured, and the vibration characteristic thereof was examined. FIG. 30 shows the result of comparison between the gain of the frequency response function of the disc D3.00 and that of the disc C0.4. It turned out that the gain of the disc C0.4 is reduced compared to that of the disc D3.00. FIG. 31 shows the result of comparison between the phase difference of the disc D3.00 and that of the disc C0.4. It turned out that the phase difference of the disc C0.4 is smaller than that of the disc D3.00 within the range of 0 Hz to 5 kHz. However, in the frequency range above 5 kHz, there was no obvious difference in phase difference between the disc C0.4 and the disc D3.00. The result indicates that the two circular plates of the disc C0.4 integrally vibrate in a low frequency range. FIG. 32 shows the result of comparison between the mode damping ratio of the disc D3.00 and that of the disc C0.4. The damping ratio of the disc C0.4 is larger than that of the disc D3.00 in the frequency range (0 to 5 kHz) in which the phase differences are small, and there is no obvious difference in damping ratio between the disc C0.4 and the disc D3.00 in the frequency range above 5 kHz. It would appear from these results that since the contact pressure between the layers of the laminated disc has a large influence on the vibration characteristic, and the phase difference of the disc C0.4 within the frequency range up to 5 kHz in which the damping ratio is large is small, the damping ratio is increased not by collision damping, but by clone friction damping.

Figure 33:
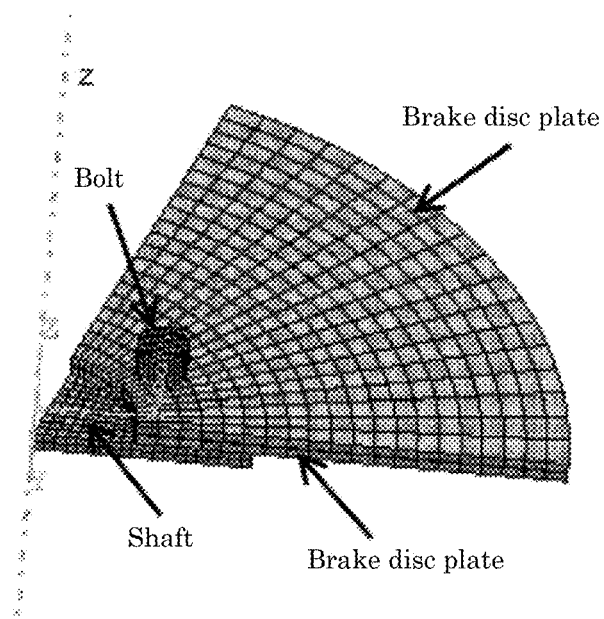
FIG. 33 is an explanatory drawing of an analytical model of the contact pressure generated between the layers of a laminated disc.
Figure 34:
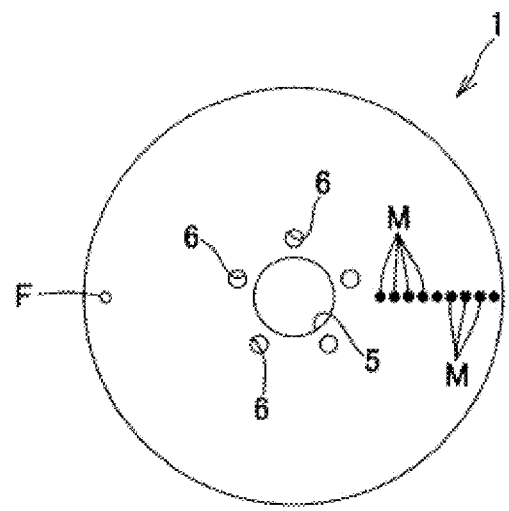
FIG. 34 is an explanatory drawing of a hammering test.

Accordingly, in order to find out the cause of the difference in damping ratio between the discs, the contact pressure generated between the layers of the laminated disc was calculated using a general purpose finite element code ABAQUS6.11. FIG. 33 shows the analytical model thereof. The disc includes a 1/5 disc model, a bolt, and a shaft. The shaft was modeled as a rigid body. The contact pressure distribution was calculated taking disc-to-disc contact and friction into consideration. In the calculation, a bolt pressing force was 7000N which is the same as the bolt axial force when the bolt is actually fastened, the Yong's modulus of the disc was 205 GPa, the Poisson's ratio was 0.3, and the coefficient of friction was 0.3. As boundary conditions, the shaft was completely fixed, the shaft was connected to the disc, and the inner periphery and the outer periphery of the disc was movable only in the z direction. Further, in order to examine the compliance of a laminated disc, a hammering test was performed in such a manner that, as shown in FIG. 34, a position that lies on a horizontal line passing through the center of the brake disc 1 in the radial direction and is 130 mm away from the center was set as an excitation point F, and measurement points M for use in the measurement by an acceleration pickup were provided at 10 mm intervals in the radial direction opposite to the excitation point F across the center of the disc 1. The compliance was calculated using the following formula.

$$C(f) = A(f)/4\pi^2 f^2$$

In this formula, C represents the compliance, A represents the accelerance, and f represents the frequency. The compliance is a function obtained by dividing displacement by force, and can be considered as the size of displacement that is independent of force.

Figure 35:
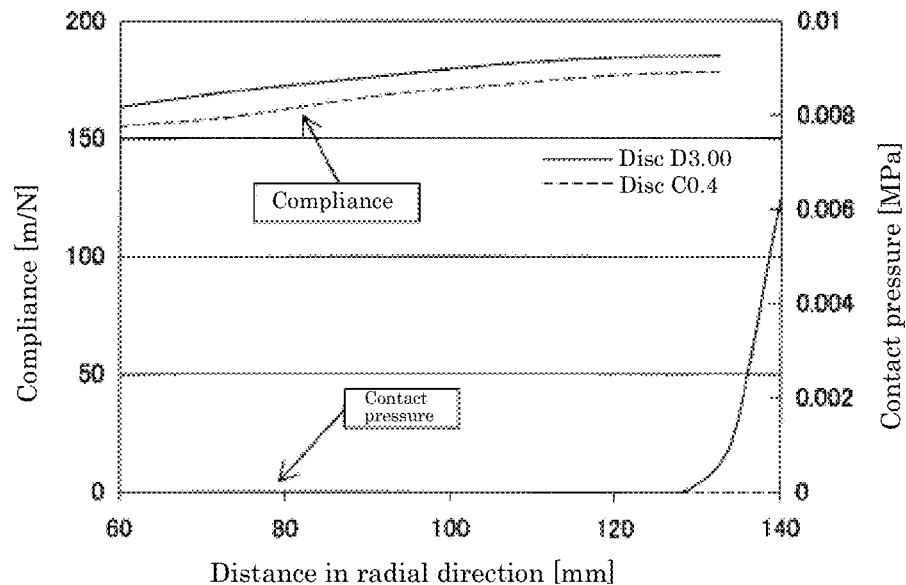
FIG. 35 is a graph illustrating the relationship between distance in the radial direction, the contact pressure, and the average compliance of each of the Disc D3.00 and the disc C0.4.

In order to averagely represent the size of displacement of each of the discs, the compliances at respective natural frequencies within the range up to 5 kHz were averaged. FIG. 35 shows the contact pressure and the averaged compliance with respect to the radial coordinate of each of the discs. It turned out that the closer the radial coordinate comes to the outer diameter of each of the discs (146 mm), the larger the amplitude of each of the discs becomes. Further, it also turned out that when bowl-shaped discs are placed to overlap with each other and then fastened with bolts, the contact pressure acts on the vicinity of the outer periphery of the disc. It would appear from these results that, by assembling, the contact pressure acts on a place where the amplitude of the disc is large when the disc vibrates, which increases the workload of friction force, and the damping ratio of the disc C0.4 is thereby increased.

(Result of Braking Test)

Figure 36:
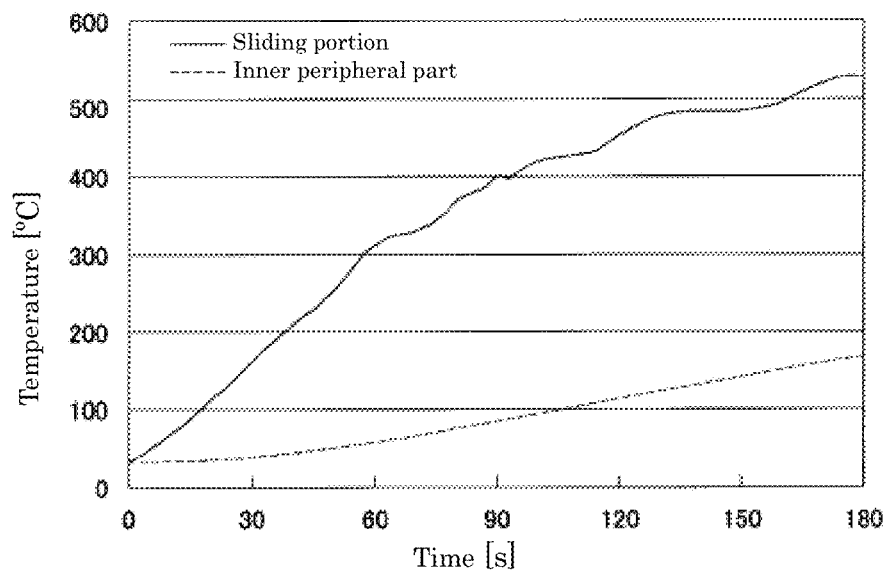
FIG. 36 is a graph illustrating the relationship between braking time and the temperature in each of a sliding portion and the inner peripheral part of a disc.
Figure 37:
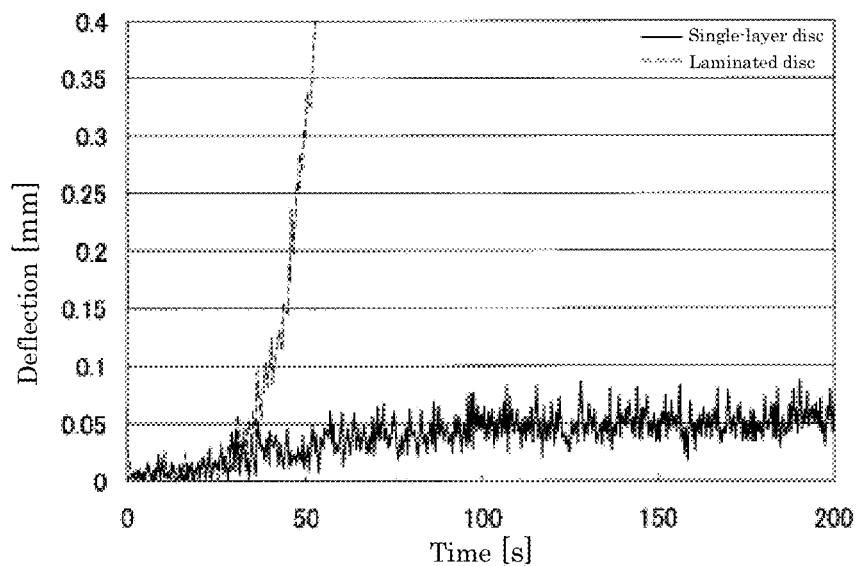
FIG. 37 is a graph illustrating the relationship between braking time and the deflection in the thickness direction of each of a single-layer disc and a laminated disc.

FIG. 36 shows the thermal histories applied to a single-layer disc during the braking test including the thermal history on the sliding portion at a position on the circumference of a 262 mm diameter circle and the thermal history on the inner peripheral part positioned at the inner side of the sliding portion at a position on the circumference of a 140 mm diameter circle. FIG. 36 shows that the temperature of the sliding portion increases up to approximately 530° C., and there is a difference of 360° C. between the measured temperature of the sliding portion and the measured temperature of the inner peripheral part. The temperature of the sliding portion obtained by using both of the coils and the pad is known as corresponding to a temperature in a sudden braking test for a two-wheeled motor vehicle. Next, FIG. 37 shows the amplitude of deflection in the thickness direction of each of the discs obtained in the braking test. In this regard, the amplitude described herein indicates the size of the amplitude of deflection while each of the discs makes one rotation. It turned out that, in the single-layer disc, even when the temperature of the outer peripheral part thereof exceeds 500° C., and the difference between the temperature of the outer peripheral part and the temperature of the inner peripheral part reaches 360° C., the size of deflection hardly changes. On the other hand, it also turned out that, in the laminated disc, when the temperature of the sliding portion becomes 130° C. or higher and the temperature difference becomes 100° C., the deflection exponentially becomes large. The reason of this can be thought as follows. When the disc is thermally deformed, the disc and the pad make ununiform contact with each other, and only a portion having a strong contact therefore receives friction. As a result, local temperature rise occurs in the disc, and the deflection rapidly becomes large after the temperature gets a certain temperature. The reason why the deflection remarkably becomes large only in the laminated disc can be considered as follows. Since bolts are fastened to the inner peripheral part of the disc, the two disc plates are not restrained in the outer peripheral part of the disc. Further, since the thickness of the disc is reduced, the bending rigidity of the disc becomes smaller than that of a single-layer disc. Generally, when the deflection of the side surface of a disc exceeds 0.05 mm, the braking torque variation becomes large, which causes uneven effectiveness of braking. Therefore, in view of safety, it is necessary to certainly keep the deflection of a disc at 0.05 mm or smaller. Therefore, the development of a laminated disc intended for practical use is expected.

(Reduction of Noise Sound Pressure of Laminated Disc Intended for Practical Use)

Figure 38:
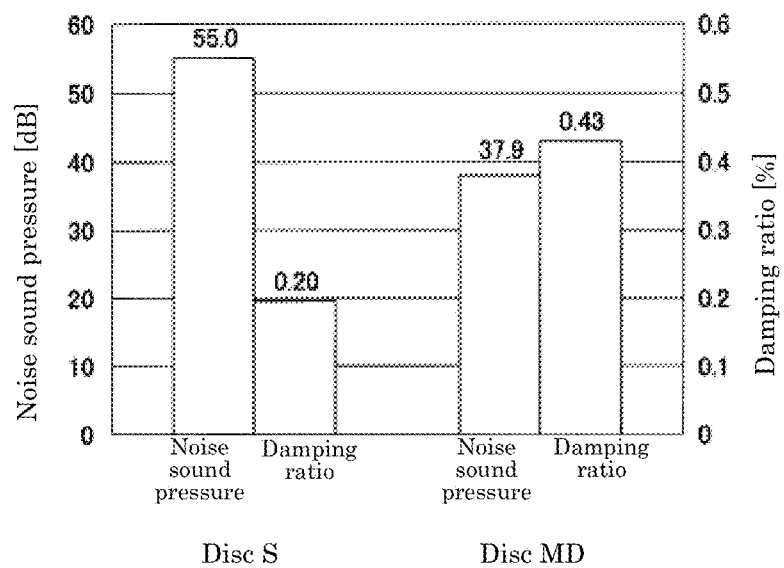
FIG. 38 is a bar graph comparing the average noise sound pressure and the damping ratio of the disc S with the average noise sound pressure and the damping ratio of a disc MD.
Figure 39:
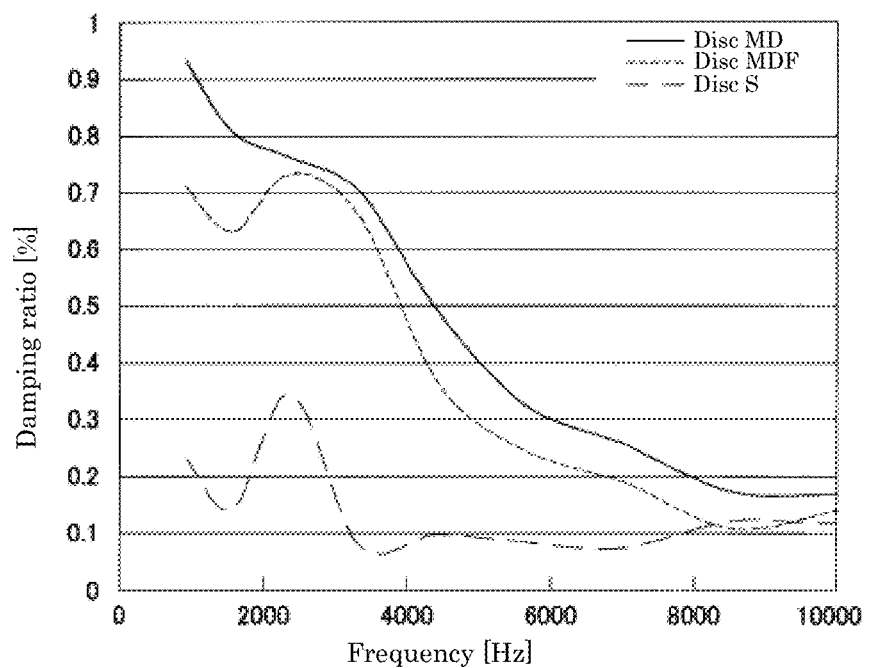
FIG. 39 is a graph illustrating the relationship between frequency and the damping ratio of each of the disc MD, a disc MDF, and the disc S.

In order to solve the above problems, a disc MD having a laminated structure as shown in FIGS. 6(a) and 6(b) was manufactured. Since the fastening method of the disc is an inner periphery fastening method, it is not possible to prevent the thermal deformation in the vicinity of the outer periphery of a disc having a laminated structure. Therefore, a thin circular plate having a small enough diameter not to cover the sliding portion was prepared, the prepared circular plate was placed to overlap with a single-layer disc, and the circular plate and the single-layer disc were fastened with bolts. Further, in order to improve the damping ratio of the thus laminated disc, the circular plate was warped into a bowl shape. Each test was performed to confirm the effect of the thus manufactured disc. The size of the deflection of the disc MD obtained in the braking test was approximately 0.05 mm which is the same as that of the disc S, and was therefore within the range that can allow the disc MD to be put to practical use. Further, FIG. 38 shows the comparison between the damping ratio obtained by the hammering test and the noise sound pressure obtained by the noise test of the disc S and those of the disc MD. In addition, a disc MDF formed by laminating flat circular plates having the same size, instead of the circular plate which is warped into a bowl shape of the disc MD, was manufactured for the purpose of comparison. FIG. 39 shows the relationship between frequency and the damping ratio of each of the discs MD, MDF, and S.

It turned out from these results that a laminated disc that is formed by laminating a bowl-shaped thin circular plate having a small enough diameter not to cover the sliding portion with a single-layer disc having a conventional thickness has small deflection in the side surface thereof, the deflection being generated by the temperature rise in the sliding portion, has a high damping ratio, and therefore has an effective structure for noise sound pressure.

The following has been made clear from the above results.

1. It could be confirmed that the frequencies of noise of the single-layer disc that includes a single circular plate (disc S) and the laminated disc that includes two circular plates having the same shape (disc D3.00) exist over a wide range, and the noise sound pressure levels of the disc D3.00 are totally reduced compared to those of the disc S. Further, brake noise is not generated in the laminated disc that includes two circular plates having different thicknesses (disc D3.75) and the laminated disc that includes bowl-shaped circular plates each having a height of 0.4 mm (disc C0.4).

2. The average value of the gains at respective natural frequencies is 43.4 dB in the disc S and 42.7 dB in the disc D3.00. Further, the damping ratio of the disc D3.00 is larger than that of the disc S which is formed by a single plate.

3. Clear resonant points can be confirmed in the disc D3.00 up to 20 kHz. On the other hand, it could be confirmed that a clear resonance point does not exist in the range of 4 kHz to 20 kHz in the disc D3.75.

4. There are differences in gain and phase between the front and back surfaces of the disc D3.75, which means that the two plates vibrate while violently colliding with each other. It would appear that the collision vibration leads to the increase of the damping ratio, and a clear resonance point therefore does not exist within the range of high frequency in the disc D3.75.

5. It would appear that, by assembling, the contact pressure acts on a place where the amplitude of the disc is large when the disc vibrates, which increases the workload of friction force, and the damping ratio of the disc C0.4 is thereby increased.

6. It turned out that, in the single-layer disc, even when the temperature of the outer peripheral part thereof exceeds 500° C., and the difference between the temperature of the outer peripheral part and the temperature of the inner peripheral part reaches 360° C., the size of deflection hardly changes. On the other hand, in the laminated disc, when the temperature of the sliding portion becomes 130° C. or higher and the temperature difference becomes 100° C., the deflection exponentially becomes large.

7. The laminated disc that is formed by laminating a bowl-shaped thin circular plate having a small enough diameter not to cover the sliding portion with a single-layer disc having a conventional thickness has small deflection in the side surface thereof, the deflection being generated by the temperature rise in the sliding portion, has a high damping ratio, and therefore has an effective structure for noise sound pressure.

REFERENCE SIGNS LIST 1 brake disc
2 brake disc plate
3 brake disc plate
4 lightening hole
5 through hole
6 mounting hole
1A brake disc
2A brake disc plate
3A brake disc plate
1B brake disc
2B brake disc plate
3B brake disc plate
1C brake disc
2C brake disc plate
3C brake disc plate
1D brake disc
2D brake disc plate
3D brake disc plate
1E brake disc
2E brake disc plate
3E brake disc plate
1F brake disc
2F brake disc plate
3F brake disc plate
10A brake disc
10B brake disc
11B brake disc plate
10C brake disc
11C brake disc plate
20 bench testing device
21 belt
22 inertia
23 alternating current motor
24 inverter
25 caliper
26 master cylinder
27 microphone
28 analyzer
F excitation point
M measurement point
P brake pad

The invention claimed is:

1. A brake disc comprising a plurality of brake disc plates, the plurality of brake disc plates being laminated so as to slide on each other by vibration during braking,
wherein specifications include at least one of an arrangement positioning of holes extending through a thickness of the brake disc plates, a number of the holes, a shape of the holes, a size of the holes, and a surface curvature of the brake disc plates being different between at least two brake disc plates in the plurality of brake disc plates.

2. The brake disc according to claim 1, wherein the specifications further include diameters of the at least two brake disc plates being made different from each other.

3. The brake disc according to claim 2, wherein the at least two brake disc plates include a first brake disc plate and a second brake disc plate, a sliding portion making sliding contact with a brake pad is formed on the first brake disc plate, and the second brake disc plate has a small enough diameter not to cover the sliding portion.

4. The brake disc according to claim 3, wherein the first brake disc plate is thicker than the second brake disc plate.

5. The brake disc according to claim 1, wherein the at least two brake disc plates have the same configuration in which holes are formed, and the plurality of brake disc plates are laminated in such a manner that the arrangement positions of the holes are displaced in the circumferential direction between the at least two brake disc plates.

6. The brake disc according to claim 5, wherein the plurality of brake disc plates are laminated in such a manner that the arrangement positions of the holes are displaced in the circumferential direction so that the phase difference of vibration in the thickness direction between each of the at least two brake disc plates becomes large when each of the at least two brake disc plates vibrates in the thickness direction.

7. The brake disc according to claim 1, wherein the specifications further include the thicknesses of the at least two brake disc plates being made different from each other.

8. The brake disc comprising a plurality of brake disc plates, the plurality of brake disc plates being laminated so as to slide on each other by vibration during braking,
    wherein specifications include at least one of holes, a thickness of the brake disc plates, a diameter of the brake disc plates, and a surface curvature of the brake disc plates being different between at least two of the plurality of brake disc plates, and
    wherein at least one of the plurality of brake disc plates has a curved surface, and the plurality of brake disc plates are laminated in such a manner that an outer peripheral part of the at least one brake disc plate is pressed against an adjacent brake disc plate.

9. The brake disc according to claim 1, wherein an adjacent one pair of brake disc plates has the same structure in surface curvature, and the plurality of brake disc plates are laminated in such a manner that outer peripheral parts of the adjacent one pair of brake disc plates are pressed against each other.

* * * * *